(12) United States Patent
Bone et al.

(10) Patent No.: US 7,805,449 B1
(45) Date of Patent: Sep. 28, 2010

(54) SYSTEM, METHOD AND APPARATUS FOR ENTERPRISE POLICY MANAGEMENT

(75) Inventors: Jeff G. Bone, Austin, TX (US); Laura Arbilla, Austin, TX (US); Keith Zoellner, Austin, TX (US); Bradley Might, Round Rock, TX (US); Jeremy Kaplan, Cedar Park, TX (US); Morry Belkin, Austin, TX (US); Peter Lee, Pflugerville, TX (US)

(73) Assignee: Stored IQ, Austin, TX (US)

( * ) Notice: Subject to any disclaimer, the term of this patent is extended or adjusted under 35 U.S.C. 154(b) by 394 days.

(21) Appl. No.: 11/262,282

(22) Filed: Oct. 28, 2005

Related U.S. Application Data

(60) Provisional application No. 60/622,733, filed on Oct. 28, 2004, provisional application No. 60/622,818, filed on Oct. 28, 2004, provisional application No. 60/622,820, filed on Oct. 28, 2004, provisional application No. 60/622,951, filed on Oct. 28, 2004, provisional application No. 60/622,955, filed on Oct. 28, 2004, provisional application No. 60/623,027, filed on Oct. 28, 2004.

(51) Int. Cl.
*G06F 7/00* (2006.01)
*G06F 17/30* (2006.01)
(52) U.S. Cl. .................................. 707/751; 707/822
(58) Field of Classification Search .................. 707/101
See application file for complete search history.

(56) References Cited

U.S. PATENT DOCUMENTS

| | | | |
|---|---|---|---|
| 4,887,204 A | 12/1989 | Johnson et al. |
| 4,897,781 A | 1/1990 | Chang et al. |
| 5,151,989 A | 9/1992 | Johnson et al. |
| 5,175,851 A | 12/1992 | Johnson et al. |
| 5,287,507 A | 2/1994 | Hamilton et al. |
| 5,313,646 A | 5/1994 | Hendricks et al. |
| 5,452,447 A | 9/1995 | Nelson et al. |
| 5,745,752 A | 4/1998 | Hurvig et al. |
| 5,764,908 A | 6/1998 | Shoji et al. |
| 5,764,972 A | 6/1998 | Crouse et al. |
| 5,819,292 A | 10/1998 | Hitz et al. |

(Continued)

OTHER PUBLICATIONS http://web.archive.org/web/20030213030333/www.deepfile.com/product.html.*

(Continued)

*Primary Examiner*—Charles Rones
*Assistant Examiner*—Kris Mackes
(74) *Attorney, Agent, or Firm*—Sprinkle IP Law Group

(57) ABSTRACT

Disclosed are systems, methods and apparatuses for managing objects in an enterprise environment according to policies. According to the invention, each policy rule ties a condition that conceptually lives in a repository to an appropriate action(s). Since each condition can be expressed in terms of metadata, policies can be applied and enforced over managed objects (files and directories) by allowing users to program appropriate corresponding action(s) via manipulating metadata stored in a metadata repository, e.g., a policy could prohibit storing MP3 files in corporate storage. In one embodiment, a user can specify a policy rule that ties the condition "no MP3 files in volumes A-Z" to an action "delete MP3 files from volumes A-Z" via a Web-based user interface. A harvester is disclosed for harvesting metadata across file systems.

20 Claims, 22 Drawing Sheets

U.S. PATENT DOCUMENTS

| | | | |
|---|---|---|---|
| 5,864,659 | A | 1/1999 | Kini |
| 5,870,734 | A | 2/1999 | Kao |
| 5,926,805 | A | 7/1999 | Hurvig et al. |
| 5,931,918 | A | 8/1999 | Row et al. |
| 5,948,062 | A | 9/1999 | Tzelnic et al. |
| 5,987,506 | A | 11/1999 | Carter |
| 6,078,929 | A | 6/2000 | Rao |
| 6,081,807 | A | 6/2000 | Story et al. |
| 6,085,234 | A | 7/2000 | Pitts et al. |
| 6,122,629 | A | 9/2000 | Walker et al. |
| 6,134,583 | A | 10/2000 | Herriot |
| 6,161,191 | A | 12/2000 | Slaughter et al. |
| 6,173,293 | B1 | 1/2001 | Thekkath et al. |
| 6,192,408 | B1 | 2/2001 | Vahalia et al. |
| 6,233,624 | B1 | 5/2001 | Hyder et al. |
| 6,247,139 | B1 | 6/2001 | Walker et al. |
| 6,266,785 | B1 | 7/2001 | McDowell |
| 6,298,386 | B1 | 10/2001 | Vahalia et al. |
| 6,317,844 | B1 | 11/2001 | Kleiman |
| 6,334,123 | B1 | 12/2001 | Ross et al. |
| 6,366,987 | B1 | 4/2002 | Tzelnic et al. |
| 6,385,624 | B1 | 5/2002 | Shinkai |
| 6,389,420 | B1 | 5/2002 | Vahalia et al. |
| 6,463,465 | B1 | 10/2002 | Nieuwejaar |
| 6,487,552 | B1 | 11/2002 | Lei et al. |
| 6,654,814 | B1 | 11/2003 | Britton |
| 6,754,660 | B1 | 6/2004 | MacPhail |
| 6,833,865 | B1 | 12/2004 | Fuller et al. |
| 7,017,183 | B1 | 3/2006 | Frey et al. |
| 7,249,168 | B1 | 7/2007 | Michaelides |
| 7,620,665 | B1 | 11/2009 | George et al. |
| 2002/0046262 | A1 | 4/2002 | Heilig et al. |
| 2002/0174306 | A1 | 11/2002 | Gajjar et al. |
| 2002/0198976 | A1 | 12/2002 | Davenport |
| 2003/0009469 | A1 | 1/2003 | Platt et al. |
| 2003/0135505 | A1 | 7/2003 | Hind |
| 2003/0135513 | A1 | 7/2003 | Quinn et al. |
| 2003/0212676 | A1 | 11/2003 | Bruce et al. |
| 2004/0098415 | A1* | 5/2004 | Bone et al. ............ 707/200 |
| 2004/0181753 | A1 | 9/2004 | Michaelides |
| 2005/0120025 | A1* | 6/2005 | Rodriguez et al. ....... 707/10 |
| 2005/0183143 | A1 | 8/2005 | Anderholm |
| 2006/0004830 | A1* | 1/2006 | Lora et al. ............. 707/102 |
| 2006/0036605 | A1 | 2/2006 | Powell et al. |
| 2006/0089932 | A1 | 4/2006 | Buehler et al. |
| 2006/0117014 | A1 | 6/2006 | Qi |
| 2006/0184530 | A1 | 8/2006 | Song et al. |
| 2006/0190455 | A1 | 8/2006 | Braddy et al. |
| 2006/0248085 | A1 | 11/2006 | Sack et al. |
| 2006/0277184 | A1 | 12/2006 | Faitelson et al. |

OTHER PUBLICATIONS http://web.archive.org/web/20030811035225/www.deepfile.com/product_auditor.html.*
http://web.archive.org/web/20030213231952/www.deepfile.com/product_enforcer.html.*
http://web.archive.org/web/20030213031244/www.deepfile.com/solutions.html.*
http://web.archive.org/web/20030214024310/deepfile.com/solutions_reporting.html.*
http://web.archive.org/web/20030214024344/deepfile.com/solutions_retention.html.*
http://web.archive.org/web/20030410120618/www.deepfile.com/solutions_hsm.html.*
http://web.archive.org/web/20030214023502/www.deepfile.com/solutions_consolidation.html.*
http://web.archive.org/web/20030811035627/www.deepfile.com/solutions_chargeback.html.*
U.S. Appl. No. 11/262,283; Jeff Bone, Laura Arbilla, Keith Zoellner, Bradley Might, Peter Lee; "Method and apparatus for harvesting file system metadata" filed Oct. 28, 2005.*
RFC1094 "Network Working Group Request for Comments: 1094" Sun Microsystems, Inc., accessed at www.faqs.org/rfcs/rfc1094.html, Mar. 1989, 21 pages.
"File and Storage System Design", accessed at www.eecs.harvard.edu/~vino/fs-perf/, printed Jul. 25, 2002, 3 pages.
"The extended-2 filesystem overview", vol. 1, Aug. 3, 1995, 17 pages.
"Draft-leach-cifs-v1-spec-02" Network Working Group, accessed at www.ubiqx.org/cifs/rfc-draft/draft-leach-cifs-v1-spec-02.html, Mar. 13, 1997, 172 pages.
AFS Frequently Asked Questions, accessed at www.angelfire.com/hi/plutonic/afs-faq.html, printed Jul. 25, 2002, 58 pages.
Coda File System, accessed at www.coda.cs.cmu.edu/index.html, printed Jul. 25, 2002, 2 pages.
RFC1777 "Network Working Group Request for Comments: 1777" Performance Systems International, accessed at www.faqs.org/rfcs/rfc1777.html, Mar. 1995, 18 pages.
"Active Directory: A Platform for Directory-enabled Networking", accessed at www.microsoft.com/windows2000/techinfo/planning/activedirectory/denad.asp, posted Nov. 7, 2000, 11 pages.
Pendry, "Amd An Automounter (1989)", accessed at www.citeseer.nj.nec.com/pendry89amd.html, printed Jul. 25, 2002, 1 page.
Oga, "Autofs Automounter HOWTO", accessed at www.linux-consulting.com/Amd_AutoFS/autofs.html, Dec. 1998, 2 pages.
Satran, et al. "IPS Internet Draft: iSCSI", accessed at www.ietf.org/internet-drafts/draft-ietf-ips-iscsi-14.txt, Jul. 1, 2002, 217 pages.
Rajagopal, et al. "IPS Working Group: Fibre Channel Over TCP/IP (FCIP)", accessed at www.ietf.org/internet-drafts/draft-ietf-ips-fcovertcpip-11.txt, Dec. 2002, 63 pages.
Rodriguez, et al. "IP Storage (IPS)", accessed at www.ietf.org/html/charters/ips-charter.html, Jul. 2, 2002, 5 pages.
"Distributed File System: White Paper", accessed at www.microsoft.com/windows2000/techinfo/howitworks/fileandprint/dfsnew.asp, posted Apr. 19, 1999, 2 pages.
Spuhler, "An Analysis of NFS Protocol Version 4" Hewlett Packard, available from tom_spuhler@hp.com, 31 pages.
"Intermezzo", accessed at www.inter-mezzo.org, printed Jul. 25, 2002, 1 page.
"FiST Home Page", accessed at www.cs.columbia.edu/~ezk/research/fist/, printed Jul. 25, 2002, 2 pages.
"FAM FAQ", accessed at www.oss.sgi.com/projects/fam/faq.html, Jul. 23, 2002, 6 pages.
"Yeast: A General Purpose Event-Action", vol. 21, No. 10, IEEE, accessed at www.computer.org/tse/ts1995/e0845abs.htm, Oct. 1995, 1 page.
Anderson, et al. "Serverless Network File Systems" accessed at www.citeseer.nj.nec.com/anderson95serverless.html, 1995, 3 pages.
Zukunft, "Recovering Active Databases" accessed at www.citeseer.nj.nec.com/zukunft95recovering.html, 1995, 2 pages.
Jaeger, et al., "An Annotated Bibliography on Active Databases" accessed at www.citeseer.nj.nec.com/221310/html, 1995, 2 pages.
Fowler, et al. "n-DFS: The multiple dimensional file system", pp. 135-154, pub. John Wiley & Sons Ltd., 1994, 21 pages.
Stern, et al. "Managing NFS and NIS" Second Edition, pub. By O'Reilly, Jun. 2001, 1 page.
Office Action mailed Dec. 15, 2006 in U.S. Appl. No. 10/630,339, 29 pages.
Office Action mailed May 31, 2007 in U.S. Appl. No. 10/630,339, 25 pages.
Office Action mailed Nov. 1, 2007 in U.S. Appl. No. 10/630,339, 32 pages.
Office Action mailed Mar. 31, 2008 in U.S. Appl. No. 10/630,339 28 pages.
Office Action mailed Dec. 19, 2008 in U.S. Appl. No. 10/630,339, 32 pages.
Office Action mailed Oct. 4, 2007 in U.S. Appl. No. 11/262,411, 14 pages.
Office Action mailed Mar. 4, 2008 in U.S. Appl. No. 11/262,411, 14 pages.

Office Action mailed Aug. 6, 2008 in U.S. Appl. No. 11/262,411, 13 pages.

Office Action mailed Jan. 26, 2009 in U.S. Appl. No. 11/262,411, 18 pages.

Office Action mailed Sep. 17, 2009 in U.S. Appl. No. 11/262,411, 19 pages.

International Search Report mailed Aug. 3, 2004 in International Patent Application No. PCT/US2003/024074, 4 pages, 7 pages.

Office Action mailed Sep. 25, 2007 in U.S. Appl. No. 11/262,283, 16 pages.

http://web.archive.org/web/20030810202503/www.deepfile.com/product.html, printed Sep. 11, 2007, 1 page.

http://web.archive.org/web/20030811035225/www.deepfile.com/product_auditor.html, printed Sep. 11, 2007, 2 pages.

http://web.archive.org/web/20030811035459/www.deepfile.com/product_enforcer.html, printed Sep. 11, 2007, 2 pages.

http://web.archive.org/web/20030810211526/www.deepfile.com/solutions.Html, printed Sep. 11, 2007, 1 page.

http://web.archive.org/20030811040239/deepfile.com/solutions_reporting.Html, printed Sep. 11, 2007, 3 pages.

http://web.archive.org/20030811040409/deepfile.com/solutions_retention.Html, printed Sep. 11, 2007, 2 pages.

http://web.archive.org/web/20030811040215/www.deepfile.com/solutions_hsm.html, printed Sep. 11, 2007, 2 pages.

http://web.archive.org/web/20030811035531/www.deepfile.com/solutions_consolidation.html, printed Sep. 11, 2007, 2 pages.

http://web.archive.org/web/20030811035627/www.deepfile.com/solutions_chargeback.html, printed Sep. 11, 2007, 3 pages.

Bone, Jeff. "Beberg's Question Re: What Deepfile Does," Jun. 19, 2003. http://www.xent.com/pipermail/fork/2003-June/022380.html, 3 pages.

Office Action mailed Apr. 17, 2008 in U.S. Appl. No. 11/262,283, 14 pages.

Office Action mailed Jul. 2, 2009 in U.S. Appl. No. 11/262,283, 14 pages.

Office Action mailed Jan. 2, 2010 in U.S. Appl. No. 11/262,283, 14 pages.

Office Action mailed Jan. 7, 2010 in U.S. Appl. No. 11/262,282, 13 pages.

Office Action mailed Apr. 26, 2010 in U.S. Appl. No. 11/973,846, 45 pgs.

Office Action mailed May 25, 2010 in U.S. Appl. No. 11/262,411, 24 pages.

Office Action mailed Jul. 7, 2010 in U.S. Appl. No. 11/973,846, 58 pgs.

* cited by examiner

SYSTEM, METHOD AND APPARATUS FOR ENTERPRISE POLICY MANAGEMENT

CROSS-REFERENCE TO RELATED APPLICATIONS

This application claims priority from provisional patent application Nos. 60/622,733, 60/622,818, 60/622,820, 60/622,951, 60/622,955, 60/623,027, all of which were filed Oct. 28, 2004 and are incorporated herein by reference for all purposes. This application relates to a co-pending U.S. patent application Ser. No. 11/262,283, filed Oct. 28, 2005 and entitled, "METHOD AND APPARATUS FOR HARVESTING FILE SYSTEM METADATA," the content of which is incorporated herein for all purposes.

FIELD OF THE INVENTION

The present invention relates generally to managing and controlling data storage resources in an enterprise environment. More specifically, the present invention relates to a system, method and apparatus for managing files and directories in file systems across various file system protocols based on policies applied to metadata in file-based data storages.

BACKGROUND OF THE RELATED ART

Today's computers require memory to hold or store both the steps or instructions of programs and the data that those programs take as input or produce as output. This memory is conventionally divided into two types, primary storage and secondary storage. Primary storage is that which is immediately accessible by the computer or microprocessor, and is typically though not exclusively used as temporary storage. It is, in effect, the short term memory of the computer.

Similarly, secondary storage can be seen as the long-term computer memory. This form of memory maintains information that must be kept for a long time, and may be orders of magnitude larger and slower. Secondary memory is typically provided by devices such as magnetic disk drives, optical drives, and so forth. These devices present to the computer's operating system a low-level interface in which individual storage subunits may be individually addressed. These subunits are often generalized by the computer's operating system into "blocks," and such devices are often referred to as "block storage devices."

Block storage devices are not typically accessed directly by users or (most) programs. Rather, programs or other components of the operating system organize block storage in an abstract fashion and make this higher-level interface available to other software components. The most common higher-level abstraction thus provided is a "file system." In a file system, the storage resource is organized into directories, files, and other objects. Associated with each file, directory, or other object is typically a name, some explicit/static metadata such as its owner, size, and so on, its contents or data, and an arbitrary and open set of implicit or "dynamic" metadata such as the file's content type, checksum, and so on. As is known in the art, metadata is basically "data about data." Directories are basically containers that provide a mapping from directory-unique names to other directories and files. Files are basically containers for arbitrary data. Because directories may contain other directories, the file system client (human user, software application, etc.) perceives the storage to be organized into a quasi-hierarchical structure or "tree" of directories and files. This structure may be navigated by providing the unique names necessary to identify a directory inside another directory at each traversed level of the structure; hence, the organizational structure of names is sometimes said to constitute a "file system namespace."

File systems support a finite set of operations (such as create, open, read, write, close, delete, etc.) on each of the abstract objects which the file system contains. For each of these operations, the file system takes a particular action in accordance with the operation in question and the data provided in the operation. The sequence of these operations over time affects changes to the file system structure, data, and metadata in a predictable way. The set of file system abstractions, operations, and predictable results for particular actions can be considered as "semantics" for the file system. While particular file systems differ slightly in their precise semantics, in general file systems implement as a subset of their full semantics a common semantics. This approximately equivalent common semantics can be regarded as the "conventional" or "traditional" file system semantics.

Storage resources accessed by some computer, its software or users need not be "directly" attached to that computer. Various mechanisms exist for allowing software or users on one computing device to access over a network and use storage assets that are actually located on another remote computer or device. There are many types of remote storage access facilities, but they may without loss of generality be regarded to fall into one of two classes: block-level and file-level. File-level remote storage access mechanisms extend the file system interface and namespace across the network, enabling clients to access and utilize the files and directories as if they were local. Such systems are therefore typically called "network file systems." Note that the term "network file system" is used herein generally to refer to all such systems—there is a network file system called Network File System or NFS, originally developed at Sun Microsystems and now in the public domain. When discussing the general class of such systems herein, the lower-case term, e.g., "networked file systems" will be used. When discussing the specific Sun-developed networked file system, the fully capitalized version of the term or its acronym, e.g., "Network File System or NFS" will be used.

Networked file systems enable machines to access the file systems that reside on other machines. Architecturally, this leads to the following distinctions: in the context of a given file system, one machine plays the role of a file system "origin server" (alternatively, "file server" or "server") and another plays the role of a file system client. The two are connected via a data transmission network. The client and server communicate over this network using standardized network protocols; the high-level protocols which extend the file system namespace and abstractions across the network are referred to as "network file system protocols." Exemplary file system protocols include the Common Internet File System (CIFS), the aforementioned NFS, Novell® Netware file sharing system, Apple® AppleShare®, the Andrew File System (AFS), and the Coda File system (Code). These network file system protocols share an approximately equivalent semantics and set of abstractions, but differ in their details and are not interoperable. Thus, to use a file system from a file server, a client must "speak the same language," i.e., have software that implements the same protocol that the file server uses.

A file server indicates which portions of its file systems are available to remote clients by defining "exports" or "shares." To access a particular remote file server's file systems, a client must then make those exports or shares of interest available by including them by reference as part of their own file system namespace. This process is referred to as "mounting" or "mapping (to)" a remote export or share. By mounting or mapping, a client establishes a tightly coupled relationship with the particular file server. The overall architecture can be characterized as a "two-tier" client-server system, since the client communicates directly with the server which "has" the resources of interest to the client.

In addition to organizing and maintaining the relationships between file system clients and file servers, additional challenges exist in managing access to and utilization of file systems. While most organizations have and enforce stringent document workflow and retention policies for their paper files, similar policies—while desired and mandated—are rarely enforced for electronic files. As a non-limiting example, many corporations have a policy that prohibits the usage of corporate storage capacity on file servers for the storage of certain personal files and content types, for instance, MP3s, personal digital images, and so on. This "policy" usually takes the form of a memo, email, etc. The administrators in charge of enforcing this policy face significant challenges. Conventional file systems do not provide mechanisms for configuring a file system to only allow particular content types or otherwise make decisions about what should be stored, where, and how. These conventional file systems are static, and the set of semantics for access and other administrative controls are rather limited. Thus any such policy enforcement that happens is done retroactively and in an ad-hoc manner via manual or mostly-manual processes. The net result is that network file storage fills up with old, duplicated, and garbage files that often violate corporate and administrative utilization policies.

In today's increasingly litigious environment and in the presence of new rules and regulations such as the Health Insurance Portability and Accountability Act of 1996 (HIPAA) and the Sarbanes-Oxley Act of 2002, the lack of management, including the inability to enforce policies consistently and effectively, represents a serious risk that corporations and businesses alike must rush to address. Unfortunately, as a direct result of the general lack of innovation and improvement in file system architecture over the last 30 years, viable solutions that could provide practical and effective policy management to enterprises do not seem to exist.

Perhaps a general comparison between typical databases systems and typical file systems could provide an insight as to the lack of innovation and improvement in file system architecture. For databases, storage is usually organized into tables arranged in a flat space (i.e., tables may not be contained in other tables) which contain records with generally fixed form. Such database systems often provide a notion of "triggers" and "stored procedures." Triggers define a set of conditions; when the database is manipulated in a way that matches some condition, the stored procedure associated with that trigger is executed, potentially modifying the transaction or operation. This mechanism is used primarily in two ways in database applications: to ensure data correctness and integrity and to automate certain administrative and application-specific tasks. The analogous facility is not available in file systems because file systems are quasi-hierarchical collections of directories and files. As such, triggers cannot be defined with associated stored procedures that can be automatically activated and enacted synchronous with a file system activity in any extant file system.

In general, implementation of triggers and stored procedures in file systems is significantly more complex than in databases systems because of less regular structure of file systems, their less formally well-defined semantics, and because file data is itself arbitrarily semi-structured and loosely typed. Implementation of programmable procedures which respond to an arbitrary file system operation by modifying the operation is challenging when the correct (i.e., traditional, expected, etc.) semantics of file systems must be preserved. There are existing systems that will generate "events" when operations occur on the file system; these events can then be used to activate arbitrary actions post-facto. However, the actions cannot themselves modify the file operation, since the event which activates them is not generated until the triggering operation completes.

Currently, the "intelligence" that a conventional file system exhibits with respect to access control is typically restricted to a static set of rules defining file owners, permissions, and access control lists. To the extent even this relatively low level of "intelligence" exists, it is usually statically defined as a part of the file system implementation and may not be extended.

In a typical enterprise, the files and directories stored in the enterprise file systems represent unstructured or semi-structured business intelligence, which comprises the work product and intellectual property produced by its knowledge workers. The work product may include business-critical assets and may range from Excel spreadsheets representing (collectively) the financial health and state of the enterprise to domain-specific artifacts such as Word documents representing memos to customers. However, in contrast to the data stored in "mission critical" information systems such as logistics systems, inventory systems, order processing systems, customer service systems, and other "glass house" applications, the unstructured and semi-structured information stored in the enterprise file systems is largely "unmanaged." It is perhaps backed up but little or no effort is made to understand what the information is, what its relevance or importance to the business might be, or even whether it is appropriately secured.

As examples, assuming that a user 'Idunno' has stored unauthorized and illegal copies of MP3 music files in a "home directory" on some file server that belong to a corporation 'Big Corp' where Idunno works. In doing so, Idunno has perhaps violated a corporate policy of Big Corp stating that no MP3 files are to be stored on the network. However, since the "home directory" is not visible to the system managers, the system managers have no knowledge to this violation, nor any automated means of remedying the situation. Even in the event that the system managers are able to episodically inventory the file systems for such violators, they are often loathe to automatically take appropriate actions (e.g., deleting) on such offending files. The reason is that, more often than not, while they have the responsibility for enforcing such policies, they do not have the authority to do so. To remedy this, the end-user (i.e., the file owner—in this example, Idunno) or some other responsible party must be brought "into the loop." Other examples of file management policies might include: documents relating to patients' individual medical conditions within a healthcare provider business might be stored in such a way that perhaps would violate the privacy and/or security constraints of HIPAA; or financial documents within the finance operation of a Fortune 2000 company might be stored in such a way that perhaps would violate both regulatory requirements under the Sarbanes-Oxley Act of 2002 and internal corporate governance considerations.

The pressing need to monitor file systems and to report activities related to the file systems presents a challenge of unprecedented scope and scale on many fronts. File system activity produces changes to the state of a file system. This activity can affect changes to the structure, the stored metadata, and the stored data of the directories and files. Generally speaking, this activity is not logged in any way; rather, the file system itself holds its current state. Some file systems— called "journaling" file systems—maintain transient logs of changes for a short duration as a means of implementing the file system itself; however, these logs are not typically organized in any way conducive to monitoring and reporting on the state of the file system and its activity and are not made available to external programs for that purpose. Further, these logs are frequently purged and therefore provide a poor basis for reporting of historical and trend data.

One significant and open problem is that of collection, redaction, and analysis of high-level data about what a file system is being used for, what is stored in it, by whom and for what purpose. Solutions today involve software programs or users explicitly walking through the file system structure, gathering the data required, and then analyzing it and/or acting on it, etc. Collection of file system data proactively as operations occur is generally not done as it is generally not supported by the file system itself. Furthermore, the accuracy of such collected data is usually questionable, as it reflects not an instantaneous state of the file system at any given moment, but, rather, an approximate state of the file system over the duration of the run. Without collecting and maintaining the appropriate statistics as file operations occur, it is impossible for the data, at the end of the run, to represent a correct and accurate picture of the contents of the file system at that time.

The problem of data collection and reporting is further compounded in the network file system environment. Because each server—indeed, each file system on each server—is a separate entity, it is therefore necessary to perform each data collection independently on each server. If reporting or monitoring is to be done across the network file system environment, significant challenges exist; namely, because of the parallel and discrete nature of the collection runs, it becomes difficult or impossible to sensibly merge the collected data into a consistent snapshot of the state of the file system at some time.

It is further the case that collection and storage of all such data as it occurs could be untenably burdensome; such logs would "grow" quickly and consume additional storage capacity at an undesirable rate. The ability to both collect such data as it occurs and dynamically redact or "historize" it would allow ongoing statistics to be maintained while simultaneously constraining the total amount of storage capacity that must be dedicated to such a purpose.

SUMMARY OF THE INVENTION

Disclosed is a practical and effective solution to enterprise policy management. One embodiment of the invention builds and maintains an out-of-band file system metadata warehouse for use in file management applications such as the automated implementation and application of file management policies. Various forms of metadata can be used in embodiments of the invention.

In one embodiment, four functions are involved: collection of metadata; storage of metadata; access to metadata for the purpose of reporting and ad hoc queries; and taking action on the cataloged files and directories based on the metadata stored in the metadata repository.

One of ordinary skill in the relevant art will appreciate that each of these functions involves unique challenges, for example:

(1) Metadata is collected out-of-band, and this imposes both performance constraints and data freshness concerns.
(2) The volume of data can be vast. A typical enterprise stores millions to tens of millions of files per terabyte, and may have many terabytes. Traditional system management applications regard such things as users, servers, desktops, printers, and so on as managed objects. Policies are applied to these managed objects on a per-file basis. Thus, in the traditional system management arena, an enterprise might have hundreds of thousands of managed objects. In comparison, in embodiments disclosed herein, each file or directory must be regarded as a managed object. As such, metadata must be collected, stored, maintained, accessed, and used for tens of millions to billions of "managed" files and directories and the file management applications that address this must scale accordingly to hundreds of millions to tens of billions of managed objects.

To address these unique challenges, embodiments of the invention employ a "harvester", which can be implanted, for example as a set of computer instructions stored on a computer readable medium and executable by a computer processor to harvest file system metadata. The harvester according to embodiments of the present invention harvests file system metadata via network file system protocols, encapsulating both the common harvesting operations and the file system protocol-specific mechanisms in a single, integrated data collection facility.

In one embodiment, the metadata repository is optimized to support the automated and/or semi-automated application of file management policies over managed objects in the file system(s). In implementing automated and/or semi-automated policy enforcement over files and directories, it is desirable to separate the notion of the objects that may be acted upon (the files and directories and the metadata about them) from the set of actions which may be taken on such objects. Disclosed is a generic design by which arbitrary metadata associated with files and directories may be used to trigger arbitrary actions taken on those files and directories.

Embodiments of the present invention provide many technical advantages. For example, both sparse and dense attributes are considered. By considering both "sparse" attributes of high semantic value as well as the traditional "dense" attributes, a much higher semantic level of policy management may be obtained. Moreover, it unifies management of metadata over all file and directory assets and maintains a *persistent* and persistently useful metadata repository of all such metadata.

Additional objects and advantages of the present invention will become apparent to one skilled in the art upon reading and understanding exemplary embodiments described herein with reference to the following drawings.

BRIEF DESCRIPTION OF THE DRAWINGS

FIGS. 1-4 are schematic diagrams illustrating an exemplary architecture in which embodiments of the invention may be implemented, wherein FIG. 1 illustrates a computer system connected to a data transmission network, FIG. 2 illustrates a network file system architecture, FIG. 3 illustrates a 2-tier network file system software architecture, and FIG. 4 illustrates a network file system architectural view with a file management apparatus.

FIGS. 5-12 are schematic diagrams depicting a first set of embodiments, in which FIG. 5 depicts a harvester architecture, according to one embodiment of the invention, FIG. 6 depicts a schema for storing mixed sparse/dense attributes in a file system metadata repository, according to one embodiment of the invention, FIG. 7 depicts views over file system metadata, according to one embodiment of the invention, FIG. 8 depicts the logical software architecture of a file management application, according to one embodiment of the invention, FIG. 9 depicts the operation of a single filter on a set of metadata records, according to one embodiment of the invention, FIG. 10 depicts feeding actions from filters, according to one embodiment of the invention, and FIGS. 11-12 depict a file system's structure and organization before and after the execution of a policy, according to one embodiment of the invention.

FIG. 15 is a block diagram illustrating how policy rules can be expressed in terms of conditions and actions, according to one embodiment of the invention, FIG. 16 is a block diagram depicting a system platform, according to one embodiment of the invention, FIG. 17 is a block diagram illustrating a high level architectural view of a system platform, according to one embodiment of the invention, FIG. 18 is a block diagram illustrating a federated architecture, according to one embodiment of the invention, FIG. 19 schematically shows a distributed enterprise environment where embodiments of the invention may be implemented, FIG. 20 is a block diagram schematically showing a desktop agent, according to one embodiment of the invention, FIG. 21 depicts implementations of a harvester, and FIG. 22 illustrates an exemplary harvesting process, according to one embodiment of the invention.

DETAILED DESCRIPTION

Figure 1:
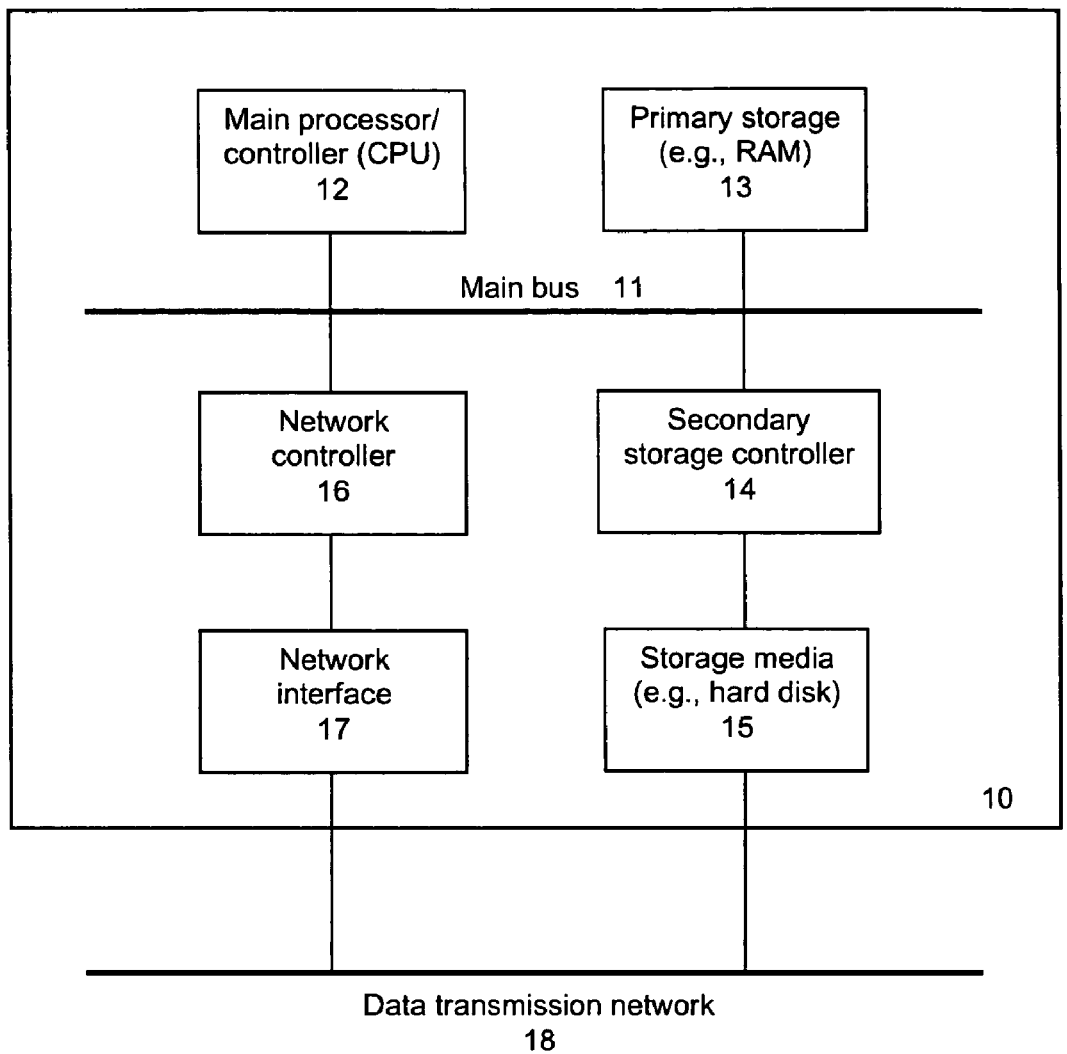

The systems and methods disclosed herein can be implemented as an integrated component of various applications, such as a network file system management device. By way of example, FIG. 1 shows a network file system management device 10 (also referred to herein as "the device" or "the management device" or "the appliance"). In one embodiment, the management device (i.e., an integrated component of various applications) is embodied in a computer system programmed with at least one software component or software system, which is described in greater detail below and which is executable by a central processor unit (CPU) 12 of computer system 10. Computer system 10 may embody the various components of the management device and subsystems with which it interacts.

In this example, computer system 10 embodying the management device comprises a main bus 11, a main processor 12, a primary storage 13, a secondary storage controller 14, a storage media 15, and optionally a network controller 16, a network interface 17, and a data transmission network 18.

Other devices which may be connected to or form part of computer system 10 may include display, mouse, keyboard, and so on. Main processor 12 can be a general purpose processor, a limited processor such as an application-specific integrated circuit (ASIC) or microcontroller, or any other instruction execution machine. Primary storage 13 provides a transient memory or storage space for use by programs executing on main processor 12. Main processor 12 communicates with primary storage 13 in a conventional manner.

Main processor 12 communicates with secondary storage controller 14 by way of main bus 11. Secondary storage controller 14 connects storage media 15 to main processor 12 by way of main bus 11. Storage media 15 may be a hard drive, compact disc read only memory (CD-ROM) drive, floppy drive, tape drive, optical storage medium, or other storage device. Secondary storage controller 14 is used to read and/or write storage media 15 on behalf of main processor 12.

Computer system 10 may communicate with other computers by way of a data transmission network 18. This is accomplished by attaching a network interface 17 to data transmission network 18, attaching network interface 17 to network controller 16, and connecting network controller 16 to main bus 11. Software running on main processor 12 may then access other computers across data transmission network 18 in any of the conventional ways, e.g., by executing "protocols" which affect the transmission and reception of protocol data units, packets, etc. over data transmission network 18.

According to one embodiment of the invention, the software component(s), which can be stored in memory of various forms, of the management device operates to cause computer system 10 to perform the following functions: (1) harvesting file and directory metadata from network file systems; (2) allowing reporting and ad hoc query functions over harvested metadata; (3) providing a mechanism that defines file management policies over managed storage(s) and that enables automated execution of such policies; (4) allowing such policies to trigger arbitrary actions which may change the state of the managed storage(s), such as, and without loss of generality, deleting files, compressing files, moving files, "flagging" files for backup, checking files into a document management system, indexing files for use in content search, generating reports, executing policies, and so on; and (5) providing a workflow model which allows human users to be included in the file management workflow such that they may be prompted for their approval before any given action are taken to bring the managed storage(s) into compliance with defined policies.

A skilled artisan will recognize that in addition to embodiments shown and described with reference to the drawings disclosed herein, other embodiments are possible. In particular, it is possible to compose components/subsystems described herein in various ways, for example, disabling certain of the functions (1)-(5) above. One embodiment described herein can address these functions (1)-(5) simultaneously. However, it should be understood that each of the subsystems (and each of the functions (1)-(5)) are independent of one another and embodiments of the invention can comprise a number of subsystems running any subset of these functions (1)-(5). Moreover, it should be noted that each of the functions (1)-(5) above and their corresponding subsystems and/or software implementations need not reside on a single computer. They can be distributed across multiple distinct computers according to embodiments of the invention.

Figure 2:
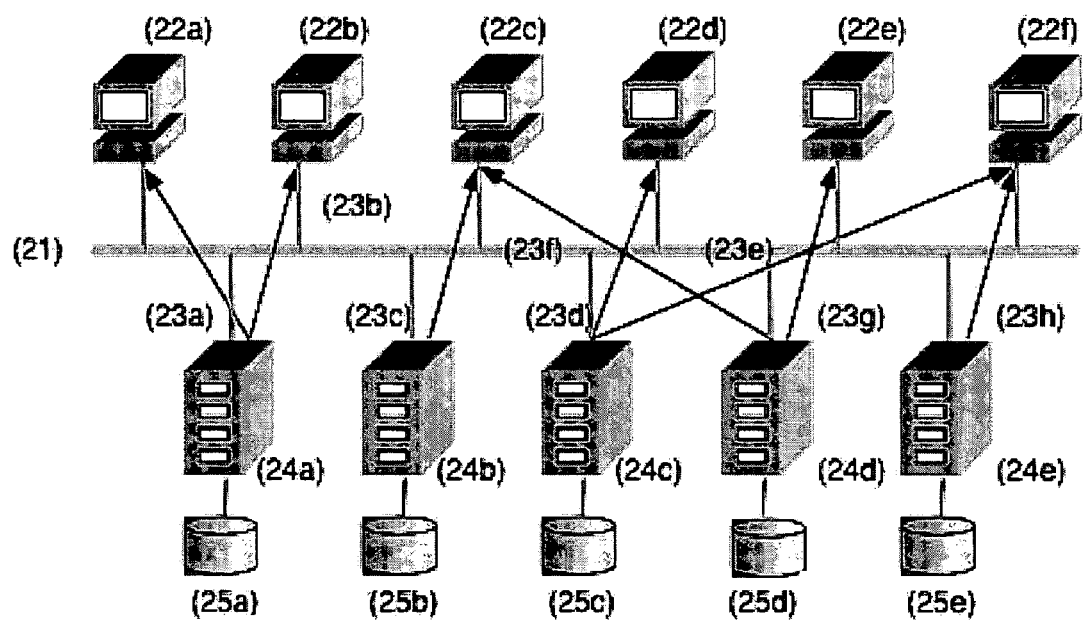

FIG. 2 is a block diagram representation of a 2-tier network file system architecture 200 comprising a data transmission network (or network) 21, a plurality of servers 24a-24e, a plurality of storage media devices with file systems 25a-25e attached to servers 24a-24e, and a plurality of client computers 22a-22f. The network file system itself is represented as connections or "mounts" 23a-23h. Each of the mounts 23a-23h is understood to be a logical rather than physical connection between the associated server and client machines. More precisely, this connection is understood to be the logical relationship between some part or all of the relevant file systems attached to the associated server machine and shared out over a certain network file system protocol (explained further below) and the associated client machine's own file system software.

Figure 3:
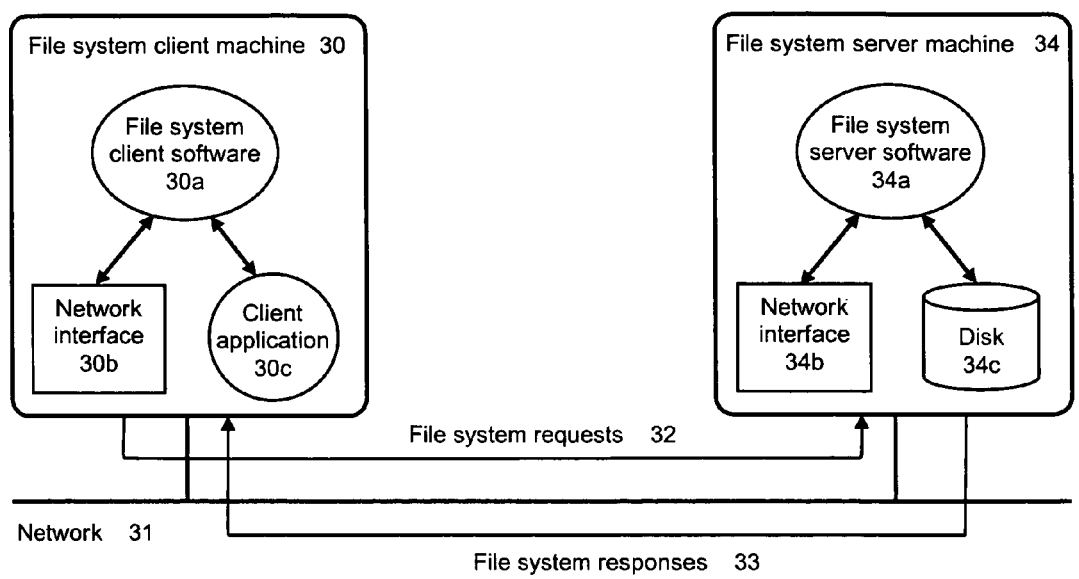

FIG. 3 is a block diagram depicting the' software architecture 300 of a 2-tier network file system, as illustrated by a single client-server pair. It comprises a network file system client machine (or client) 30 (e.g., a computer), a data transmission network 31, and a network file system server machine (or server) 34 (e.g., a computer). In this embodiment, client 30 includes file system client software 30a, network interface 30b, and client application 30c. Client 30 and server 34 communicate with each other over network 31 by exchanging file system requests 32 and responses 33. The rules by which such an exchange occur are known as a network file system protocol. There can be arbitrarily many such network file system protocols. Embodiments of the present invention are independent of and thus not limited by any particular network file system protocol.

When client application 30c wishes to access a storage medium, for example, disk 34c, located on server 34, file system client software 30a can intercept this request and direct it over network 31 to server 34, thereby generating a request 32. Network interface 34b of server 34 receives this request and directs it to file system server software 34a, which may then perform the requested action on disk 34c. Upon completion of the requested action, server 34 constructs a response 33 and directs it back to the sender (client 30) via network 31. Network interface 30b of client 30 receives this response and directs it to file system client software 30a, which in turn responds to the waiting client application 30c, thus completing a network transaction.

Figure 4:
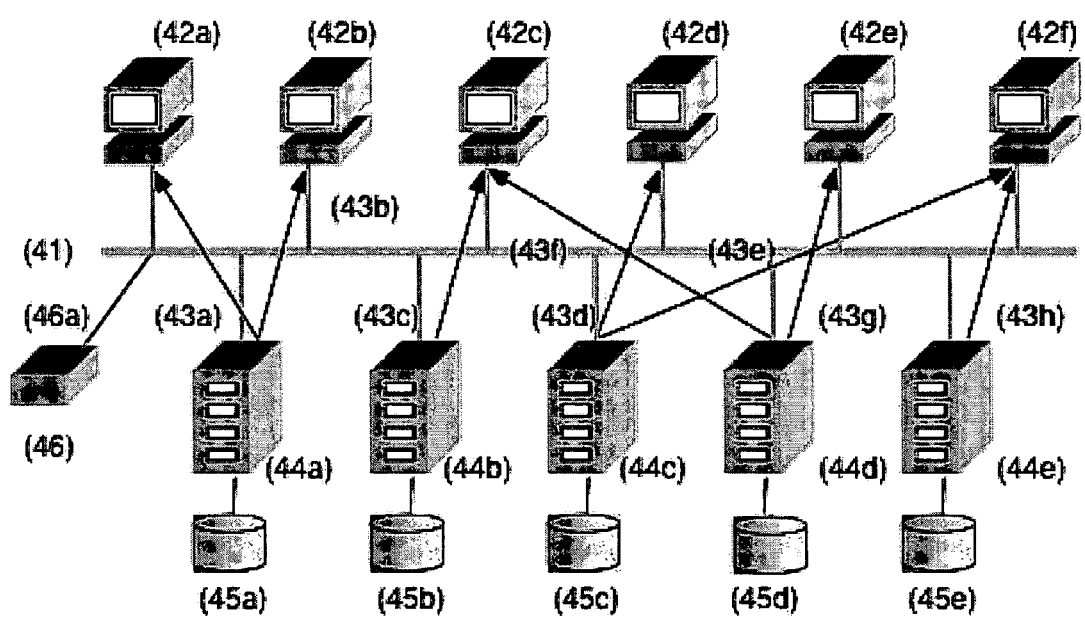

FIG. 4 is a block diagram representation of a 2-tier network file system architecture 400 comprising a data transmission network (or network) 41, a plurality of servers 44a-44e, a plurality of storage media devices with file systems 45a-45e attached to servers 44a-44e, and a plurality of client computers 42a-42f. The network file system itself is represented as the connections or "mounts" 43a-43h. Each of the mounts 43a-43h is understood to be a logical rather than physical connection between the associated server and client machines. More precisely, this connection is understood to be the logical relationship between some part or all of the relevant file systems attached to the associated server and shared out over a certain network file system protocol, and the associated client machine's own file system software. In this embodiment, a file management device or devices 46 are attached to network 41 via line 46a and may themselves mount and access any of the file systems served by servers 44a-44e in the same manner and at any time as any of the mounts 43a-43h accesses clients 42a-42f. Device(s) 46 may implement all or any combination of the functions (1)-(5) listed above, more details of which will now be described with reference to FIGS. 5-13.

Function (1): Harvesting File and Directory Metadata from Network File Systems.

Figure 5:
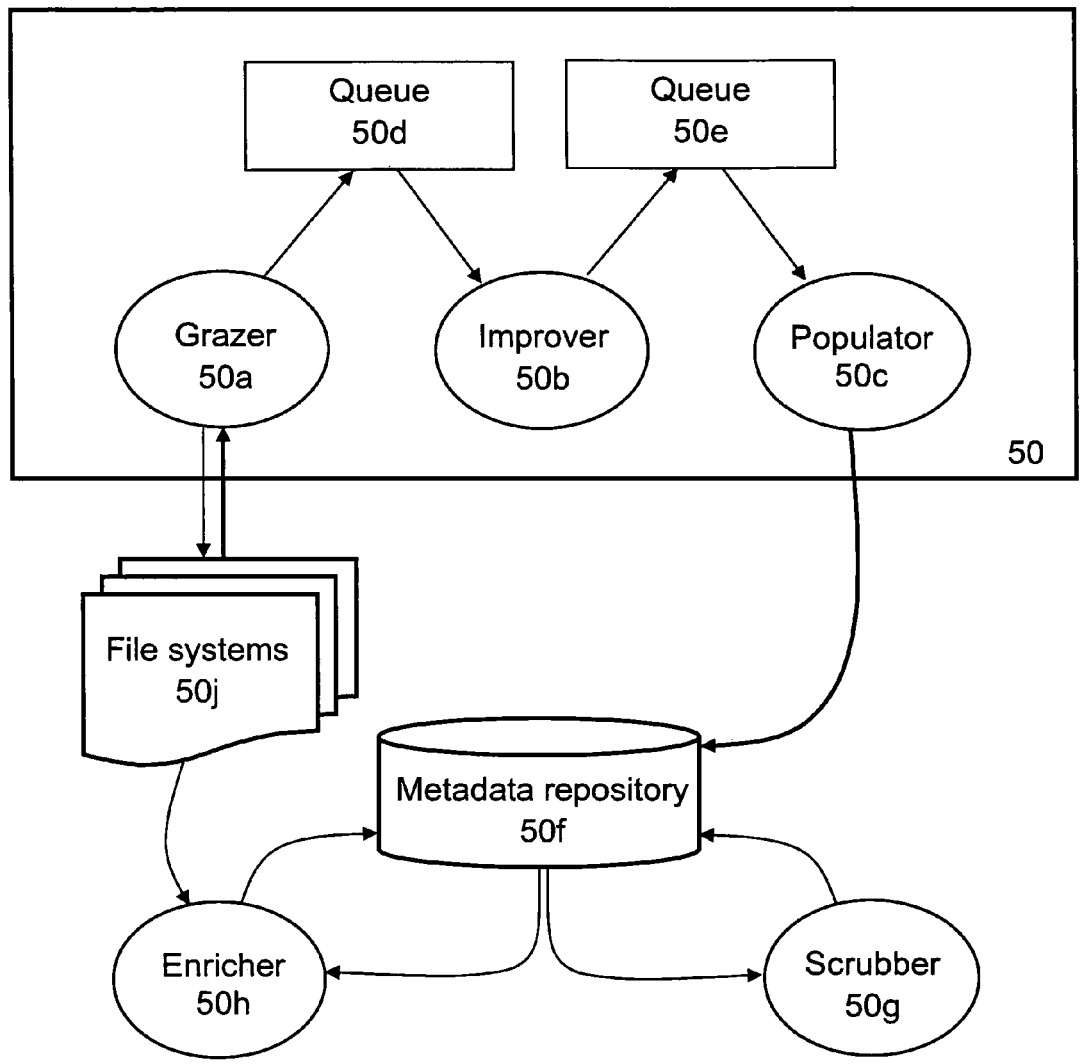

In one embodiment, the management device is configured with a software component referred to as a "harvester" for harvesting file and directory metadata from network file systems in a fast and efficient manner. FIG. 5 is a block diagram depicting a system 500 comprising a harvester 50, file systems 50j, and a metadata repository 50f. Harvester 50 in this embodiment comprises several discrete components, including a grazer 50a, an improver 50b, a populator 50c, a queue (or grazer-improver queue) 50d connecting grazer 50a and improver 50b, and a queue (or improver-populator) 50e connecting improver 50b and populator 50c.

It should be understood that components 50a-50e of harvester 50 may reside at one computer system (e.g., computer system 10) or more than one computer as described above with reference to FIG. 1. For example, queues between remote components could be configured to support some remote network interface capable of transmitting and receiving data across data transmission networks. Such a remote network interface can take many forms including industry-standard remote procedure call (RPC) protocols, hypertext transfer protocol (HTTP), Common Object Request Broker Architecture (CORBA), Distributed Component Object Model (DCOM), and so on. CORBA and DCOM are designed to support objects created in any language.

FIG. 5 illustrates the interactions between harvester 50 and file systems 50j in the process of "harvesting" metadata from file systems 50j, according to one embodiment of the invention. In this example, grazer 50a interacts with file systems 50j to receive its file metadata. In this embodiment, the metadata is "canonicalized" (i.e., transformed into a common representation, for example, attribute-value pairs, extensible markup language (XML), or any other suitable data representation that is understood by improver 50b). Each metadata "record" (i.e., a set of attributes associated with a file or directory that is being "grazed") is placed in queue 50d. FIG. 5 also shows the interactions between harvester 50 and other system components of system 500, particularly with regard to concurrency. In this embodiment, grazer 50a, improver 50b, and populator 50c, each runs in its own thread, asynchronously and concurrently with one another. These subcomponents are loosely coupled and coordinated by way of queues 50d-50e and by way of their "parent component" (i.e., harvester 50) process lifecycle and context.

In this embodiment, improver 50b operates to synthesize or calculate any desired attributes that may be computed from the raw metadata collected by grazer 50a. As improver 50b reads content out of queue 50d, it can improve, if necessary, the set of attributes associated with each metadata record for each file or directory. Improver 50b is configured to perform a plurality of computations including checksums, hashes, basic file typing, and so forth. In one embodiment, all operations that interact with the file content directly are performed via improver 50b to take advantage of cache locality on the file server. Upon completion of "improvement" of each file or directory metadata, the transformed metadata record is placed in queue 50e.

According to the embodiment shown in FIG. 5, populator 50c reads the improved metadata records from queue 50e and inserts them into a metadata repository 50f according to some scheduling heuristic. In one embodiment, this is done in a batch fashion so that a plurality of insertions can be combined into a single bulk upload to amortize the cost of the database operation across many metadata records. Other methodologies can also be used.

In one embodiment, a scrubber 50g may be included to read the metadata repository 50f and make judgments about the "freshness" of the data in the metadata repository 50f on an item-by-item basis. Depending upon the freshness of each item, scrubber 50g may determine when to deprecate, expire, or otherwise garbage collect metadata.

In one embodiment, an enricher 50h may be included to perform metadata collection tasks: (a) that are likely to be lengthy and/or performance intensive, (b) that require interaction with the file system or other external system in some idiosyncratic fashion, and (c) whose purpose is the collection of "optional" metadata which is not required for the normal or baseline functioning of the system. Examples might include: high-level semantic classification of certain document types, full-text indexing of suitable documents, etc. In such cases, enricher 50*h* may retrieve a list of enrichment candidates from metadata repository 50*f*, perform one or more desired enrichment operations, and update the associated metadata in metadata repository 50*f*.

Figure 6:
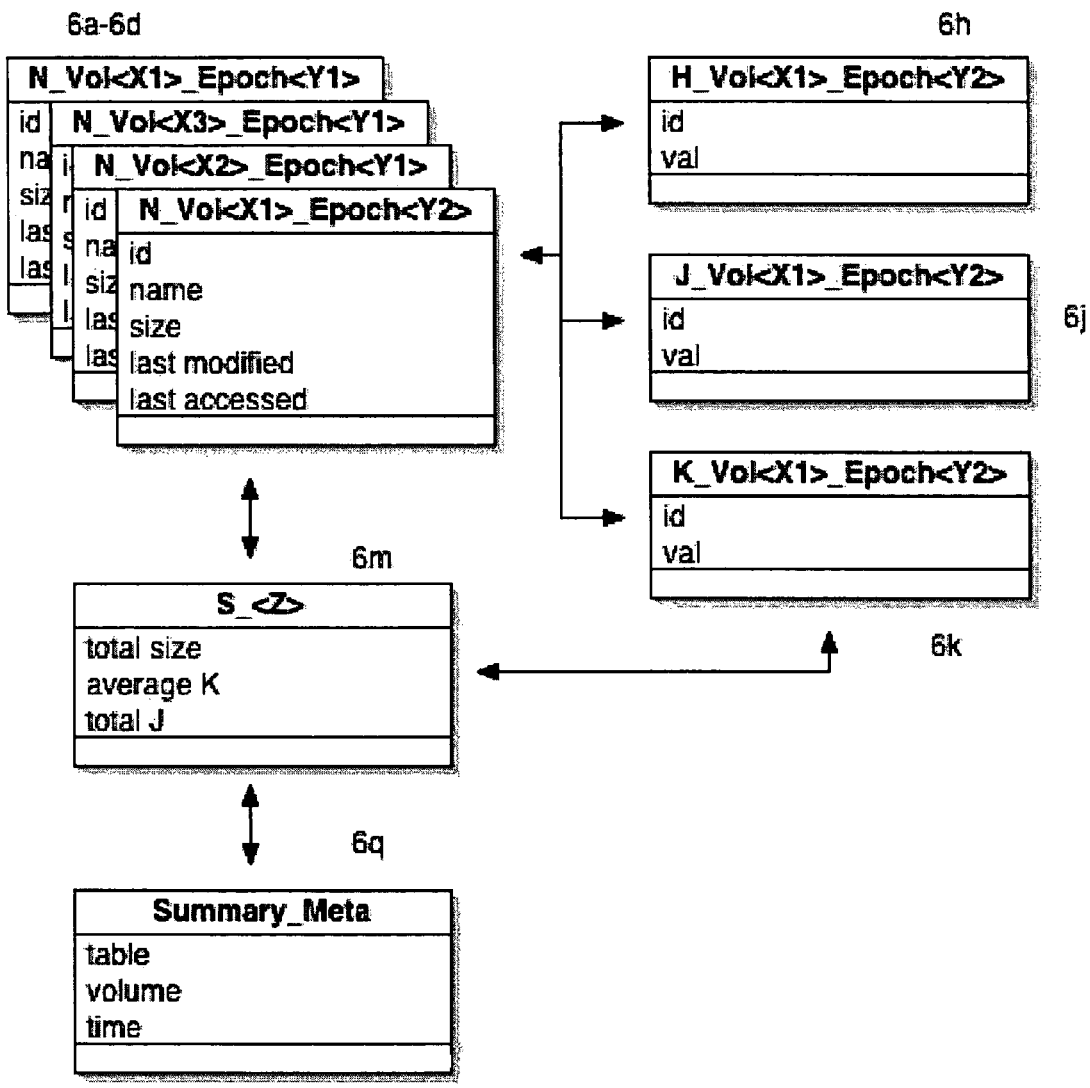

FIG. 6 depicts a schema 600 for storing file system metadata that mixes both sparse and dense attribute spaces within a single relational database. Each volume (i.e., a logical collection of files and directories, e.g., a mountable share where subject files reside on a server) is given its own "node data" table representing the denormalized dense attribute space common to all file systems. More than one of these node data tables may exist for a single volume. These node data tables are "timestamped" by an "epoch" corresponding to the system's definition with regard to the "freshness" of the data contained therein. Each node data table follows a fixed schema, and each row corresponds to the dense set of attributes for all files and directories on that volume. A set of exemplary node data tables is depicted as objects 6*a*-6*d* in FIG. 6.

For the sparse attributes (i.e., those attributes that are not shared by all files and directories in a file system), a single table exists for every attribute-volume-epoch combination. In FIG. 6, a set of three attribute tables 6*h*, 6*j*, 6*k* respectively contains attributes called "H," "J," and "K". Each attribute table 6*h*, 6*j*, 6*k* follows a simple schema: each row in attribute table 6*h*, 6*j*, 6*k* has an object identifier (id) that is used as a foreign key in joining each attribute table 6*h*, 6*j*, 6*k* to an appropriate node data table, and a value (val) for the attribute. In one embodiment, assuming all instances of the same attribute have the same type, it is not necessary to store type information in the attribute table directly. In that case, it is represented as usual in the data catalog/schema facility of a relational database. Foreign key relationships between the id field in the node data tables 6*a*-6*d* and the id field in the corresponding attribute tables 6*h*-6*k* are used to join the tables as needed.

In one embodiment, summary tables may be included to provide pre-computed roll-ups, aggregates, or other computations over one or more node data tables and/or one or more associated attribute tables. Summary tables serve to minimize query time for queries involving these types of computations. Summary tables may be generated either in response to changes to the set of tables (e.g., adding a new node data table, etc.) or on-demand (e.g., whenever a "synthetic" summary attribute is first referenced in some query). They remain valid only as long as their referenced node data tables are still "fresh" and are deprecated and eventually garbage collected, when their associated/referenced source tables are deprecated and/or garbage collected. An exemplary summary table 6*m* is depicted in FIG. 6.

Summary table metadata is maintained by the underlying system (e.g., system 500) so that the system knows which summary tables correspond to which source node data tables or attribute tables. Summary table metadata is maintained via a Summary_Meta catalog table which records this information. The Summary_Meta information can be joined, linked, or correlated to the associated summary tables via the database's own metadata and data catalog facilities and/or through known naming conventions. An exemplary Summary_Meta catalog table 6*q* is depicted in FIG. 6.

Figure 7:
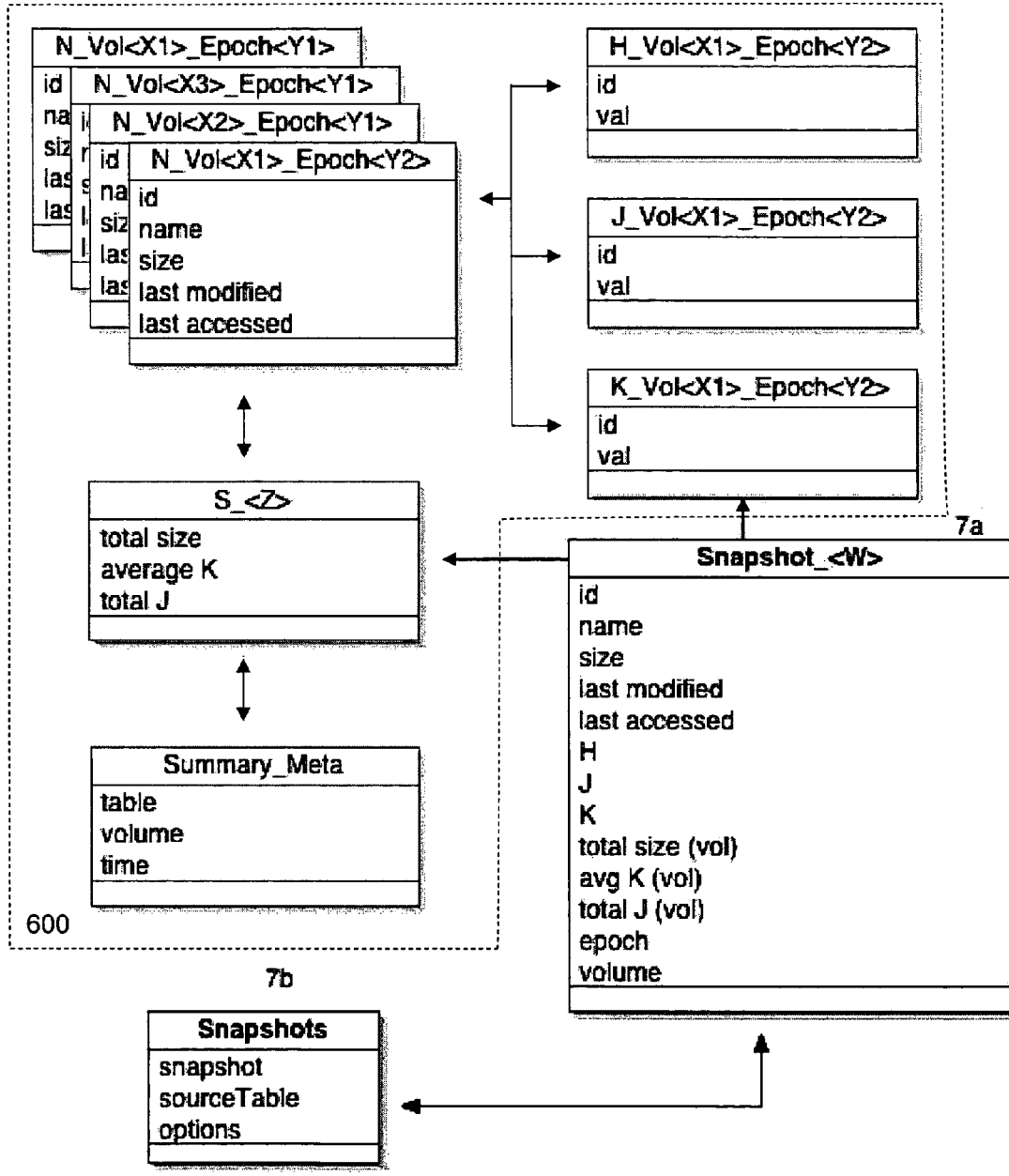

FIG. 7 depicts a view ("snapshot") 7*a* over much of the data associated with a set of volumes. As with summary tables described above with reference to FIG. 6, "snapshot" tables have their own lifecycle, referential integrity, and other considerations. Such snapshots can be synthesized on-the-fly by a query pre-processor or optimizer. Alternatively, they can be constructed statically either inside or outside of the lifecycle of the underlying tables. Metadata about these snapshot tables is kept in a separate Snapshots metadata catalog 7*b*, which can be joined, linked, or correlated with view 7*a* either by way of the underlying database's own metadata catalog and/or by way of known naming conventions.

Function (2): Allowing Reporting and Ad Hoc Query Functions Over Harvested Metadata.

Figure 8:
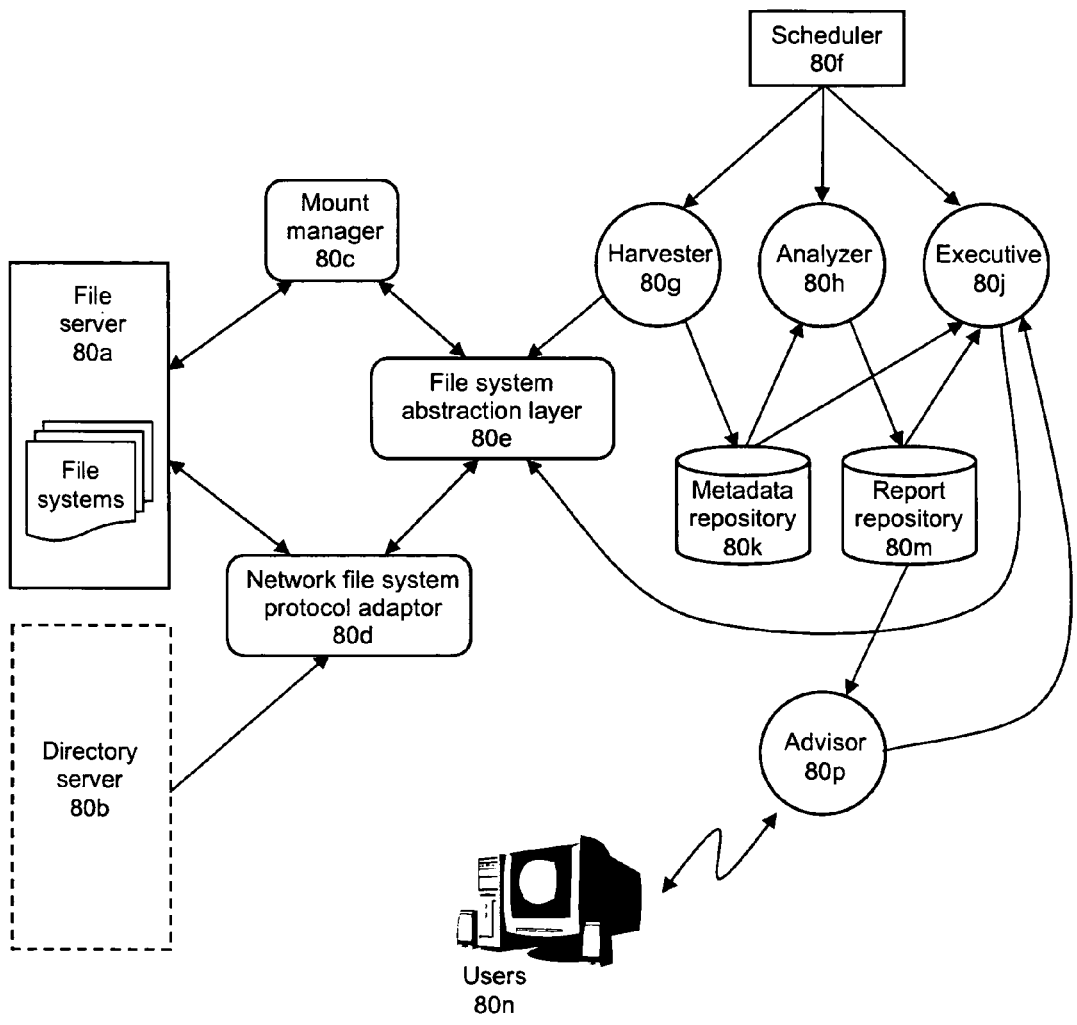

In one embodiment, the management device is configured with a file management software system that allows for reporting and ad hoc query functions over harvested metadata. FIG. 8 is a block diagram depicting the logical software architecture of a file management system 800 according to one embodiment of the invention. In this embodiment, system 800 comprises one or more of the following components: a scheduler 80*f*, a harvester 80*g*, an analyzer 80*h*, an executive 80*j*, a metadata repository 80*k*, a report repository 80*m*, an advisor 80*p*, a file server or file system 80*a*, a mount manager 80*c*, a network file system protocol adaptor 80*d*, a file system interface abstraction layer 80*e*, zero or more directory servers or authentication domain servers 80*b*, and one or more users 80*n*. These components can be deployed on one or more computers connected by one or more data networks, as described above with reference to FIG. 1.

In this embodiment, mount manager 80*c* mounts file systems from file server or servers 80*a* and interacts with them according to typical file system protocols. Mount manager 80*c* provides the generic abstraction of file system interaction semantics that are common to most or all file systems.

In this embodiment, file system protocol adaptor 80*d* provides interfaces to file system and protocol specific operations and semantics, for instance, obtaining and/or modifying Access Control Lists (ACLs) in file systems and protocols that support ACLs rather than more primitive permissions operations. File system protocol adaptor 80*d* also provides interfaces to directory servers, authentication and authorization domain services, and so forth, on a per-file system protocol, per-domain basis.

In this embodiment, file system interface abstraction layer 80*e* provides a common interface to both mount manager 80*c* and file system protocol adaptor 80*d* for use by higher-level components such as harvester 80*g*, analyzer 80*h*, and executive 80*j*.

In this embodiment, scheduler 80*f* runs other components according to a configured schedule. Components that may be run by scheduler 80*f* include harvester 80*g*, analyzer 80*h*, and executive 80*j*. Harvester 80*g* makes use of file system interface abstraction layer 80*e* to collect file and directory metadata from the managed file systems 80*a* and to aggregate it in metadata repository 80*k*. Analyzer 80*h* utilizes the metadata stored in metadata repository 80*k* to generate reports and stores them in report repository 80*m*.

Function (3): Providing a Mechanism for Defining File Management Policies Over Managed Storage and Enabling Automated Execution of Such Policies.

Referring to FIG. 8, in this embodiment, executive 80*j* reads information from metadata repository 80*k* and potentially information from report repository 80*m* to make decisions (without human intervention) about what actions to take on the managed files and directories residing, for example, at file server 80*a* and directory server 80*b*. These actions may be specified in accordance with certain defined policies. Exemplary actions will be described in greater details later. They can be taken by exercising file system interface abstraction layer 80e and may be triggered automatically and/or manually in a variety of ways, for example, by a scheduled query, or by interacting with an end user as described below.

In this embodiment, an end user 80n can view reports that have been generated by analyzer 80h and stored in report repository 80m. This user review process is mediated by an advisor 80p which operates to render a user interface to user 80n. These reports may present user 80n with a list of files and directories and a variety of options to act on them. If user 80n chooses any of these actions, executive 80j is informed of the chosen action(s). In response, executive 80j proceeds to execute the chosen action(s) via file system interface abstraction layer 80e. It should be understood that the user interface presented by advisor 80p may be a Web-based interface, a "thick client" interface, a command line interface, an active HTML-based e-mail interface, or any other form of user interface. It should also be understood that the chosen actions may be executed synchronously or asynchronously. In the latter case, they may be executed immediately or batched for later execution.

Function (4): Allowing Such Policies to Trigger Arbitrary Actions which May Change the State of Managed Storage(s).

Figure 9:
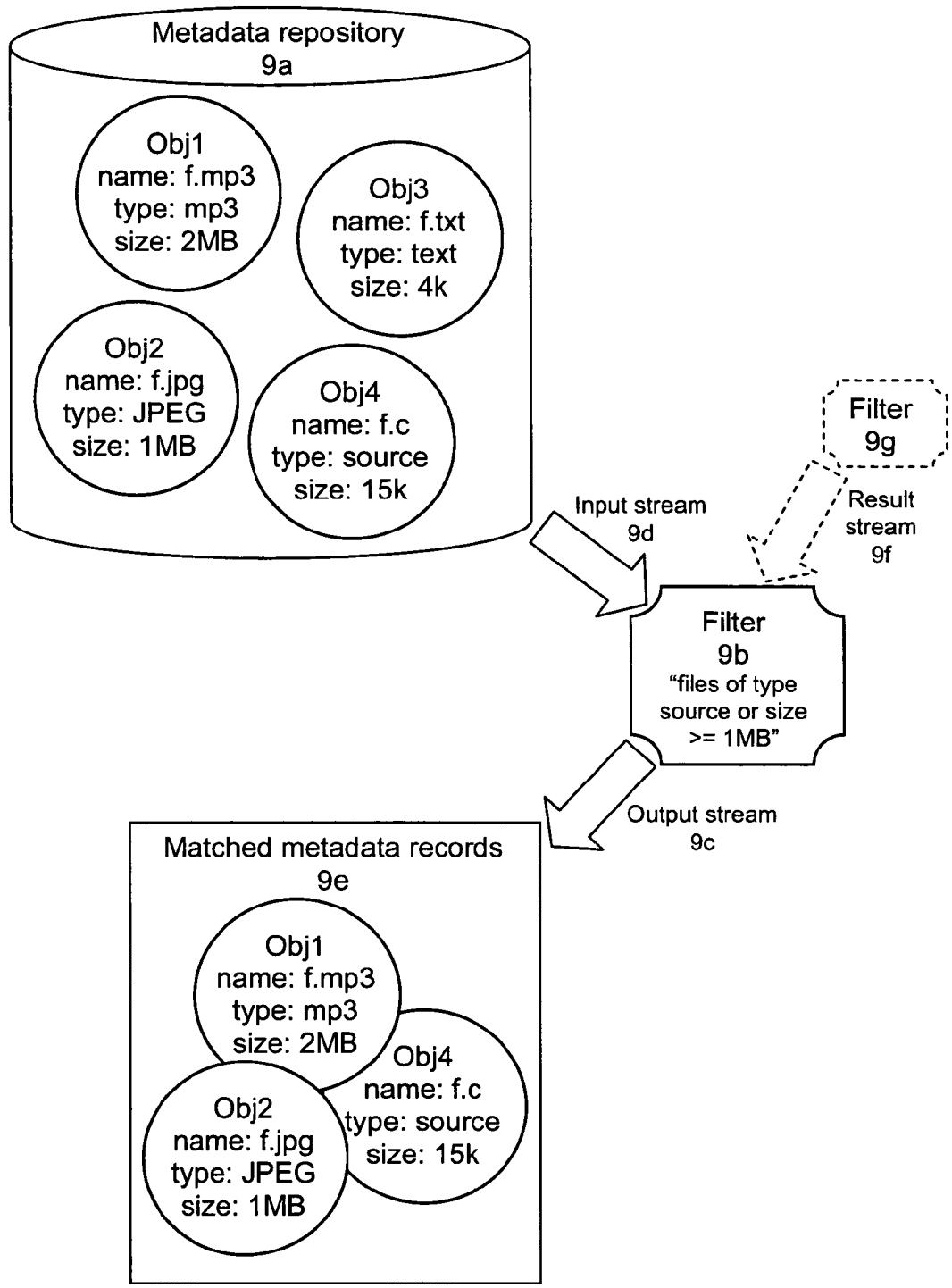

In one embodiment, the management device is configured with one or more filtering mechanisms that may trigger arbitrary actions which may change the state of managed storage (s). Exemplary actions may include, but not limited to, deleting files, compressing files, moving files, flagging files for backup, checking files into a document management system, indexing files for use in content search, etc. FIG. 9 is an abstract diagram depicting the operation of a single filter on a set of metadata records, each of which contains a set of attributes and values. It also depicts the operation of a "compound" filter on such a set, as would be obtained by "composing" multiple filters into a single filter. In FIG. 9, a metadata repository 9a containing "metadata records" for four managed objects (Obj1, Obj2, Obj3, Obj4) is depicted. A filter 9b is applied to metadata repository 9a and receives from metadata repository 9a an input stream 9d of metadata records referred to as "metadata events." Filter 9b may also receive a result stream 9f from another filter 9g as depicted in FIG. 9. Filter 9b contains a filter definition with filtering criteria which specify which records are to be selected. An output stream or result stream 9c from filter 9b contains all the metadata records 9e that match the specified filtering criteria from input stream 9a and optionally from result stream 9f.

Figure 10:
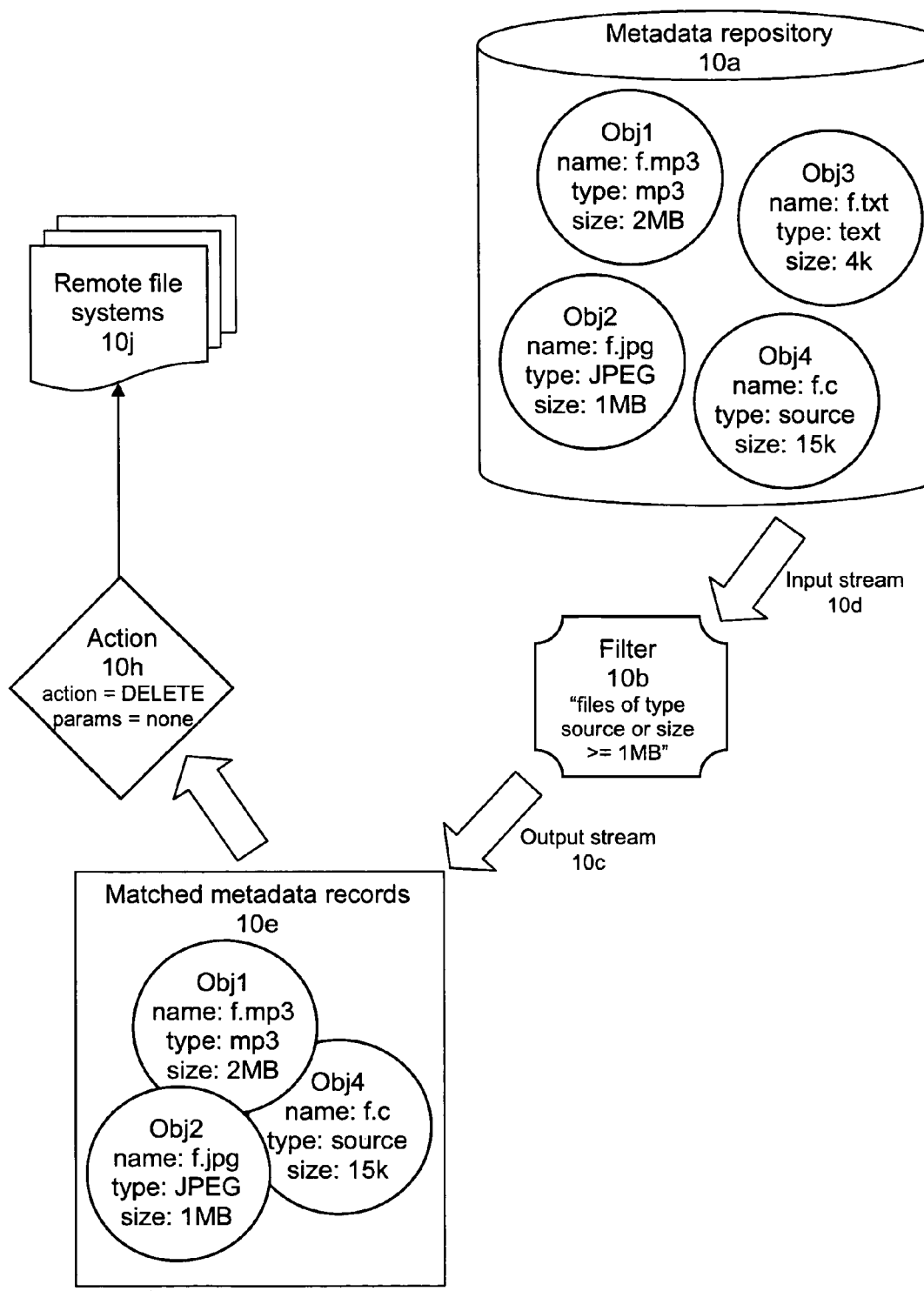

FIG. 10 depicts an action 10h reading matched metadata records 10e from an output stream 10c of a filter 10b operating on an input stream 10d of a metadata repository 10a as described above with reference to FIG. 9. Action 10h reads each metadata record and accordingly executes a specified action (in this case, "DELETE") with specified parameters (in this case, "none") against remote file system(s) 10j in which the managed objects (in this case, files Obj1, Obj2, Obj4) reside.

Figure 11:
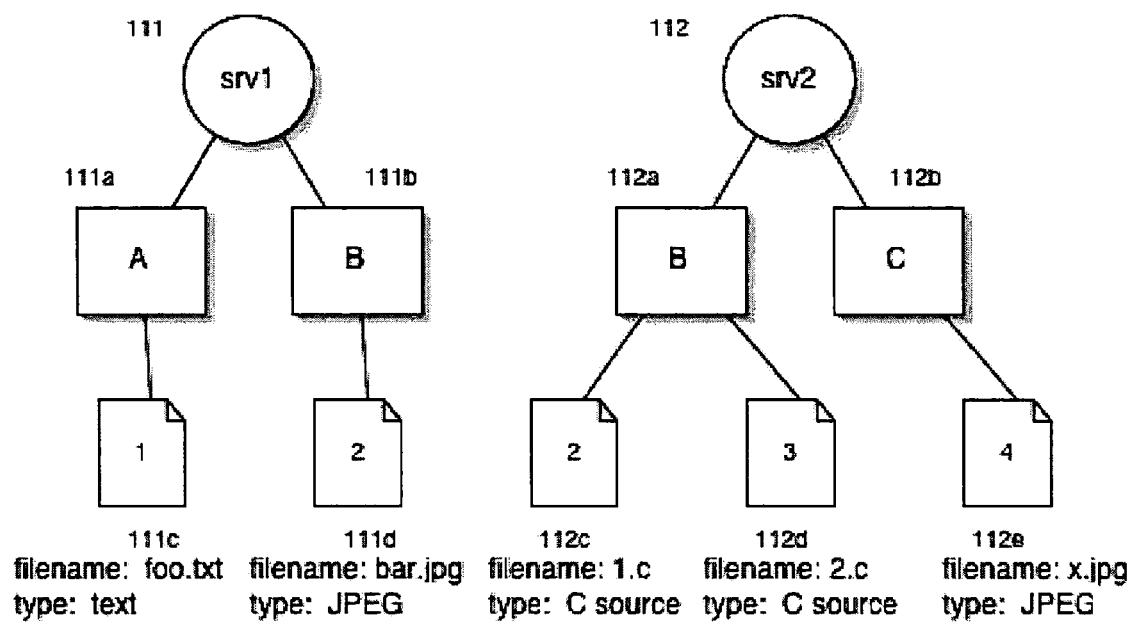
Figure 12:
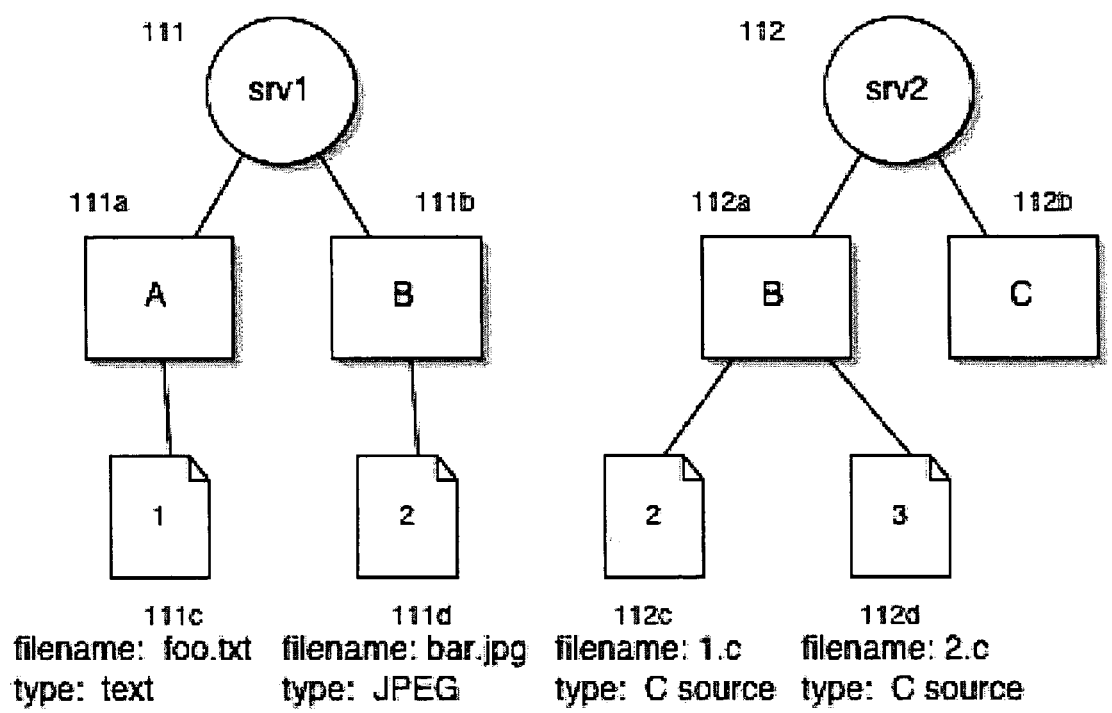

FIGS. 11-12 depict the structure and organization of a file system before (1100a) and after (1100b) the execution of a policy. According to embodiments of the invention, each policy is comprised of a condition and an action. The execution of a policy refers to taking a condition that conceptually lives in a repository, tying it to an action, and applying that action across managed objects (files and directories). By way of example, FIG. 11 depicts two "volumes" or independent file system directory trees srv1 111 and srv2 112. In this example, volume 111 contains two directories 111a, 111b named "A" and "B", respectively, Directory 111a contains a file 111c called "1". Directory 111b contains a file 111d called "2". Volume 112 contains two directories 112a, 112b named "B" and "C", respectively. Note that directory 112a, although it is named "B," it is different from and independent of directory 111b, which is also named "B" on volume 111. Directory 112a contains two files 112c, 112d called "2" and "3", respectively. Directory 111b contains one file 112e called "4".

FIG. 12 depicts the same file system described above with reference to FIG. 11 after the execution of a policy that has a filter specifying files from volume 112 of type JPEG with an action of "DELETE." In this case, file 112e, "4", which is on volume 112 and of type JPEG, is deleted from file system 1100b. It should be noted that filters specifying files to be acted on can be arbitrarily complex and may be composed together to produce new filters. Also note that the actions taken can be arbitrary; the notion here is to use harvested metadata stored in a metadata repository to drive actions taken against particular files.

Function (5): Providing a Workflow Model which Allows Human Users to be Included in the File Management Workflow.

As described above with reference to FIG. 8, one embodiment of the invention allows human users to be included in the file management workflow such that they may be prompted for their approval before any given action are taken to bring the managed storage into compliance with defined policies. This is not an easy task because, for example, a single end user may have multiple, different user identities across domains. To appropriately and consistently apply policy across one or more domains, each user 80n is given a single unified identity that is associated with zero or more corresponding domain identities. For more teachings on involving end users in file management policy actions, readers are directed to co-pending U.S. patent application Ser. No. 11/262,411, filed Oct. 28, 2005 and entitled "SYSTEM AND METHOD FOR INVOLVING USERS IN OBJECT MANAGEMENT."

One of ordinary skill in the art will recognize that it is possible to implement the above-described functions (1)-(5) in various ways without departing from the spirit and principle of the invention. To illustrate, another set of embodiments will now be described with reference to FIGS. 13-22.

As mentioned above, each file or directory in a computing environment (e.g., a corporate computer network) that implements embodiments of the invention is regarded as a managed object. Utilizing methods and systems disclosed herein, the metadata of all (potentially tens of millions to billions) of these "managed" files and directories can be collected, stored, maintained, accessed, and used to enforce and manage policies applicable to those files and directories. The range and scale of such a policy management capability afforded by embodiments of the present invention disclosed herein can be particularly useful in ensuring that all files and directories of an entity (e.g., a health care enterprise) are in compliance with applicable rules and regulations (e.g., HIPAA).

Figure 13:
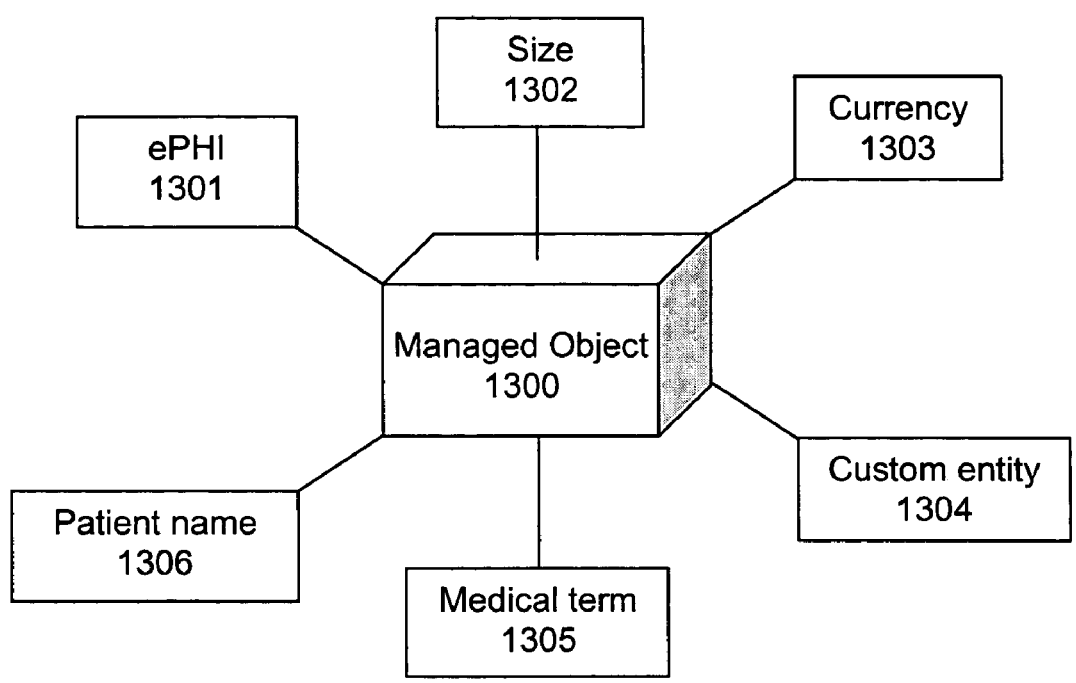
FIGS. 13-22 are schematic diagrams illustrating a second set of embodiments, in which FIG. 13 schematically shows an exemplary managed object having a plurality of metadata of various types, according to one embodiment of the invention, FIG. 14 schematically shows an exemplary metadata repository storing both dense and sparse attributes, according to one embodiment of the invention.

FIG. 13 schematically shows an exemplary managed object (in this case, a file 1300) with a plurality, of metadata (in this case, attributes 1301-1306). As an artisan will appreciate, the number and types of attributes shown here are meant to be exemplary and not to be construed as limiting. In this example, attribute 1301 indicates that file 1300 contains electronic Protected Health Information (ePHI); attribute 1302 indicates the file size of file 1300; attribute 1303 indicates the age or "freshness" of file 1300; attribute 1304 indicates that file 1300 contains or is associated with certain custom entities, e.g., projects; attribute 1305 indicates that file 1300 contains or relates to a medical term; and attribute 1306 indicates that file 1300 is associated with a particular patient.

In embodiments of the invention, harvested metadata can encompass the full and unique (disjoint) semantics of each given file system protocol. As exemplified in FIG. 13, types of "harvested" metadata according to embodiments of the invention can include, but not limited to:

File system metadata, e.g., size 1302, currency 1303, etc. These are typical file system attributes from file systems and correlated application such as size, owner, various measurements of "age," and so on.

Content-based metadata, e.g., patient name 1306, medical term 1305, etc. These are content-specific entities within documents that can be described by the presence or absence of various keywords (or combinations of keywords), regular expressions, concepts, proximity, scope, and so on. A regular expression is a character sequence that is an abbreviated definition of a set of strings. A concept is described by a natural language entity (e.g., "Phil's Pharmacy"). Content-based metadata can be used to define entities in file classifications, each of which consists of one or more attributes and can be associated with one or more volumes.

Synthesized metadata. These may be mathematical checksums or hashes of file contents.

High-level "semantic" attributes, e.g., ePHI 1301, that serve to classify and categorize files and documents, useful for automating application of appropriate policies.

Other forms of metadata can also be used in conjunction with embodiments of the invention.

Figure 14:
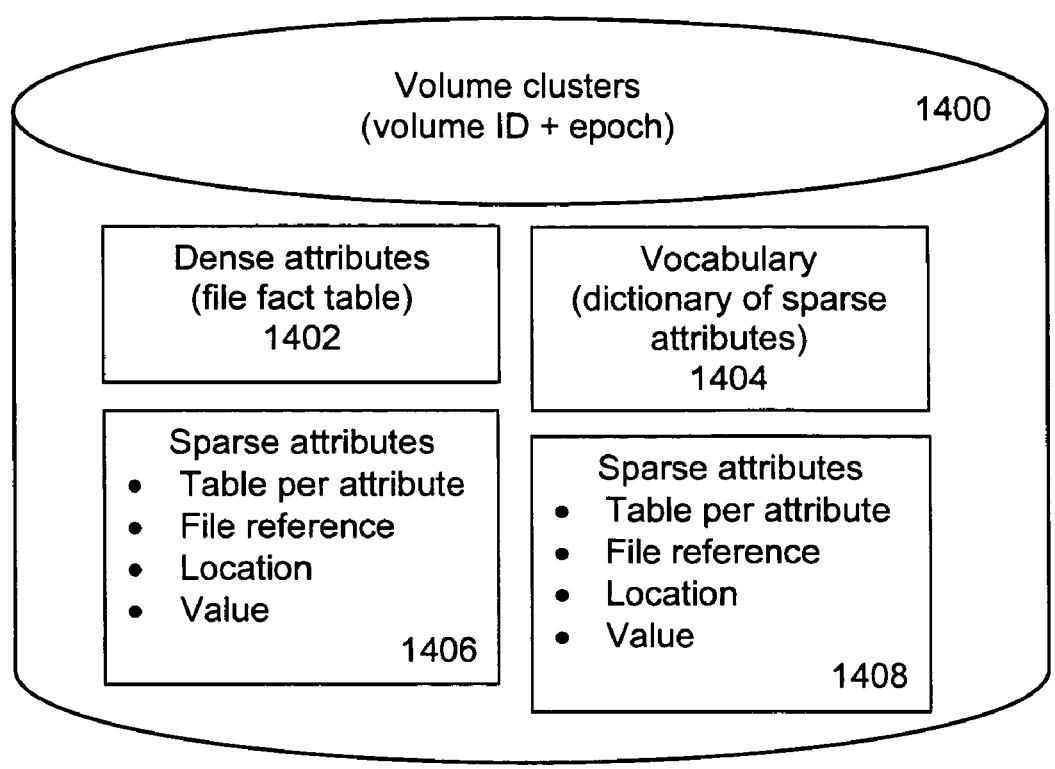

FIG. 14 depicts an exemplary metadata repository 1400 for storing various types of metadata of "managed" files and directories. In this example, metadata repository 1400 contains four volume clusters 1402, 1404, 1406, 1408, each of which stores a set of dense attributes, a set of sparse attributes, or a dictionary thereof. Metadata repository 1400 is configured to store both dense and sparse attributes of all managed files and directories. Dense attributes are attributes that are common to all managed objects, e.g., file system metadata. Sparse attributes are attributes that may be uncommon or even unique to a single object, e.g., attribute tables, file reference, location, value, etc.

Figure 15:
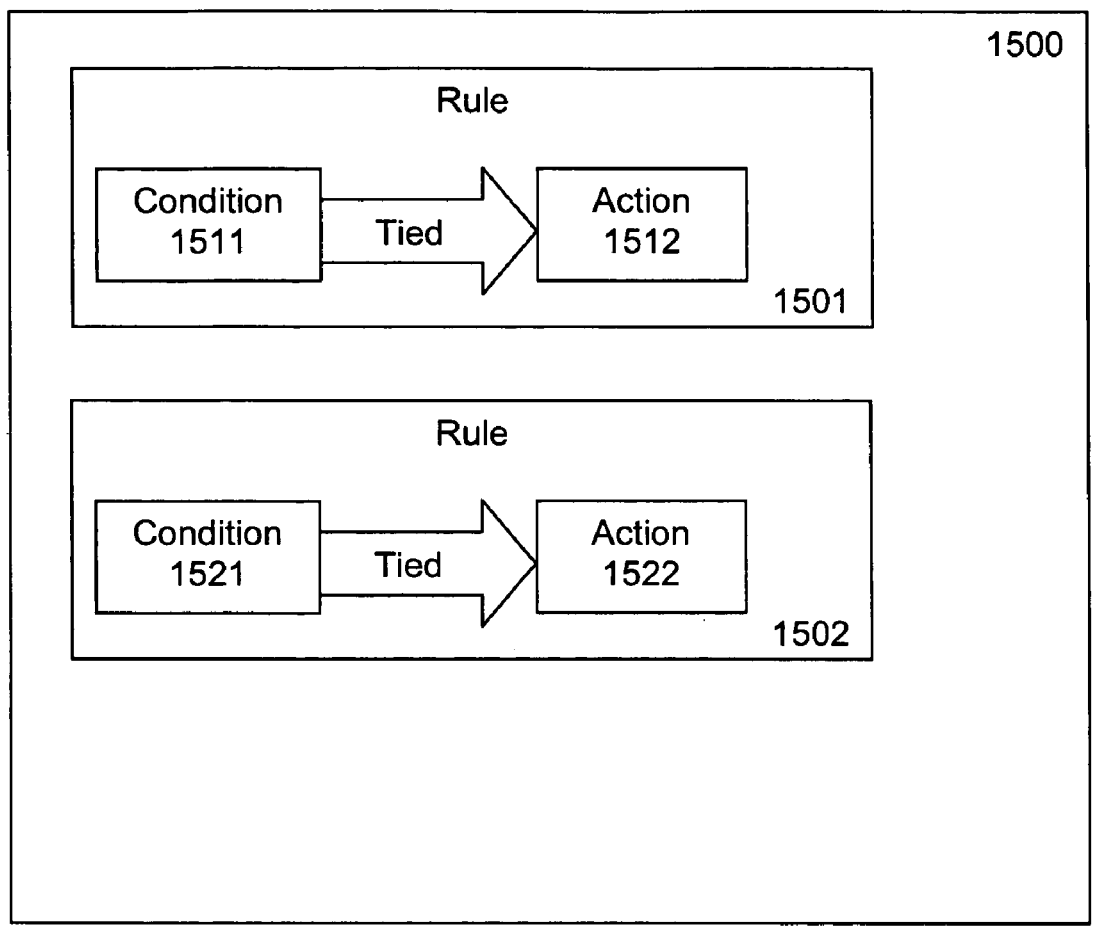

According to embodiments of the invention, policies can be expressed in terms of conditions and actions and conditions conceptually living in a repository can be expressed in terms of metadata. Thus, actions on managed objects (files and directories) may be tied to conditions through metadata, as illustrated in FIG. 15. In the example shown in FIG. 15, a policy 1500 may have a plurality of rules such as rules 1501, 1502. Each rule may require a certain action or actions to be taken if and when a certain condition is met. As such, rule 1501 may require action 1512 if condition 1511 is present. Similarly, rule 1502 may require action 1522 when condition 1521 occurs. For example, assuming that a new regulation creates a condition in which all patient records are now considered "protected health information." To comply with this new regulation, actions must be taken to protect files containing patient records. Utilizing embodiments of the systems and methods disclosed herein, an end user can define and execute a new policy that complies with the new regulation in a timely and efficient manner. For example, a user can define a policy that ties the condition (i.e., electronic patient records are protected health information) to an appropriate action (e.g., move files having a metadata "ePHI" on a volume "Public" to a secure volume "Private"). This new policy can be automatically applied to all managed objects across file systems of a managed enterprise platform.

Figure 16:
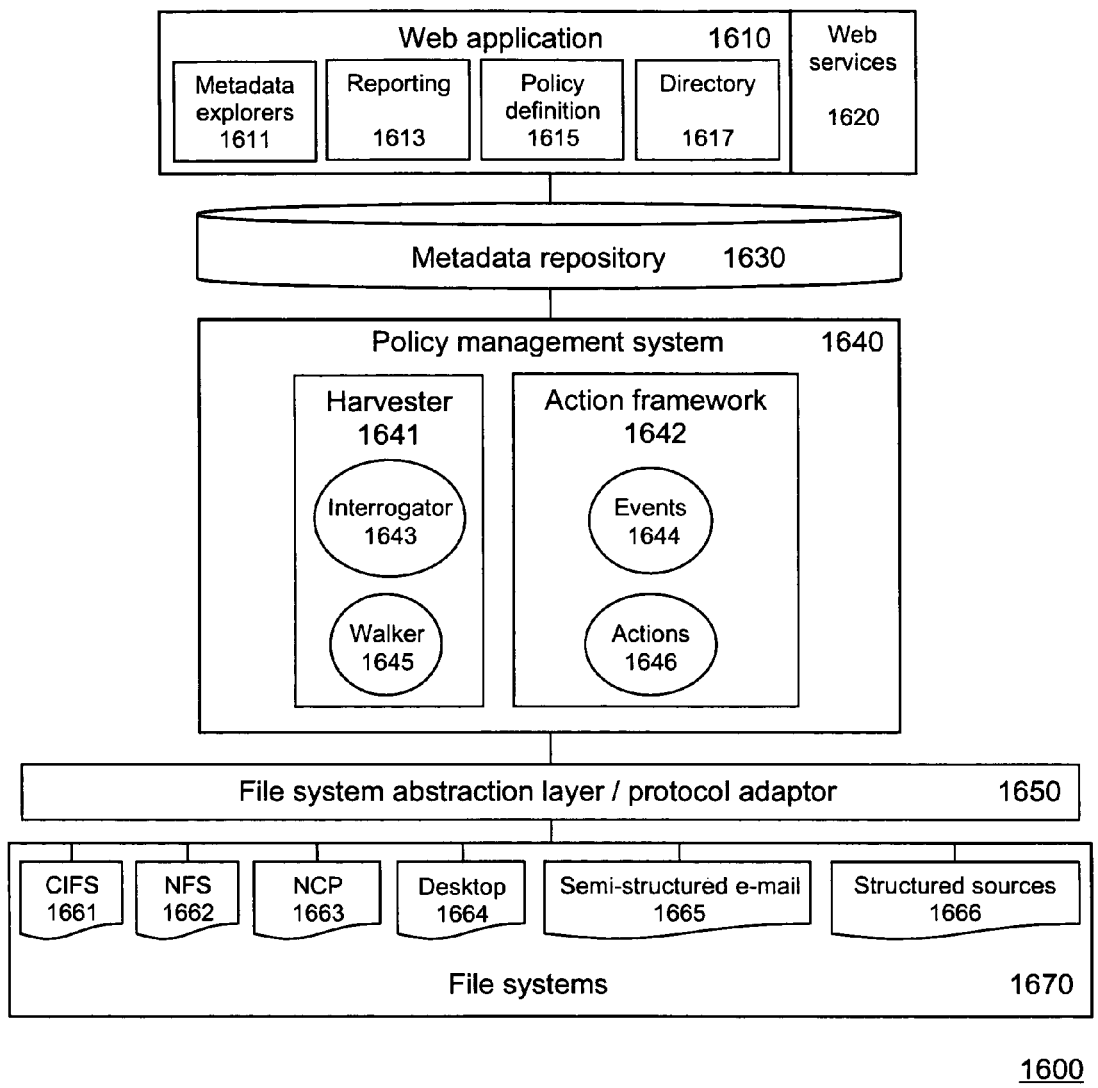

FIG. 16 depicts a platform 1600, which is also referred to as the policy director platform. In this example, platform 1600 comprises a Web application 1610 and conventional Web services 1620. Web application 1610 includes a user interface that operates to provide a plurality of functionalities such as metadata explorers 1611, reporting 1613, policy definition 1615, and directory 1617 that enable end user(s) to, for example, harvest and browse metadata, generate reports, define and execute policies, access and browse volumes, etc.

Platform 1600 further comprises a metadata repository 1630 and a policy management system 1640. Similar to metadata repository 50*f* and metadata repository 1400 described above with reference to FIGS. 5 and 14, respectively, metadata repository 1630 stores harvested metadata of all managed objects (files and directories) of file systems 1670. In the example shown in FIG. 16, policy management system 1640 comprises a harvester 1641 and an action framework 1642.

In this embodiment, action framework 1642 comprises a first component (events) 1644 and a second component (actions) 1646. Events 1644 provides typical event monitoring and routing functions and operates to assert events triggered by the generation of a new policy, which may include one or more policy rules, as well as changes made to an existing policy or policies. Actions 1646 comprises a plurality of subcomponents configured to perform various functions (e.g., transaction management, action routing, action adapter, etc.) and a plurality of actions (e.g., move, migrate, copy, delete, secure, notify, etc.) These actions are programmable. For example, each action can be programmed to perform under a certain specified condition to satisfy one or more policy rules. Each action can also be programmed to perform at a certain specified time or upon the assertion or occurrence of a certain event.

Harvester 1641 shown in FIG. 16 is configured to perform a plurality of functions similarly to those of harvester 50 described above with reference to FIG. 5. In this embodiment, harvester 1641 may comprise a first component (walker) 1645 and a second component (interrogator) 1643. Walker 1645 is configured to interact with a file system abstraction layer/protocol adaptor 1650 so that walker 1645 can conduct file acquisition on managed objects (files and directories) across file systems 1670 that operate under various file system protocols, much like "walking" around file systems 1670 to find out what files and directories need to be acted upon. In one embodiment, walker 1645 operates to locate managed objects that need to be classified, e.g., through an object classification engine.

Figure 18:
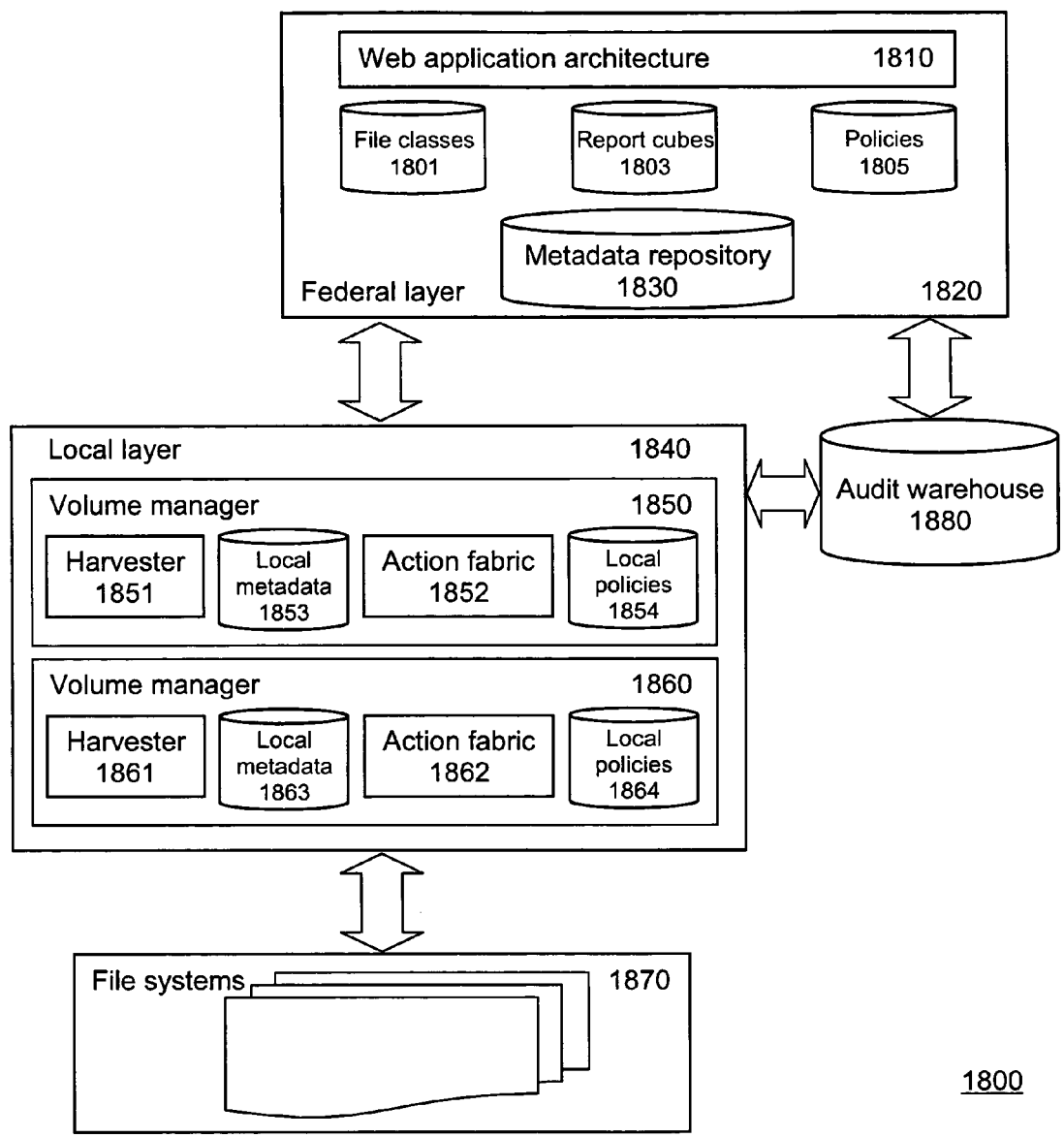
Figure 21:
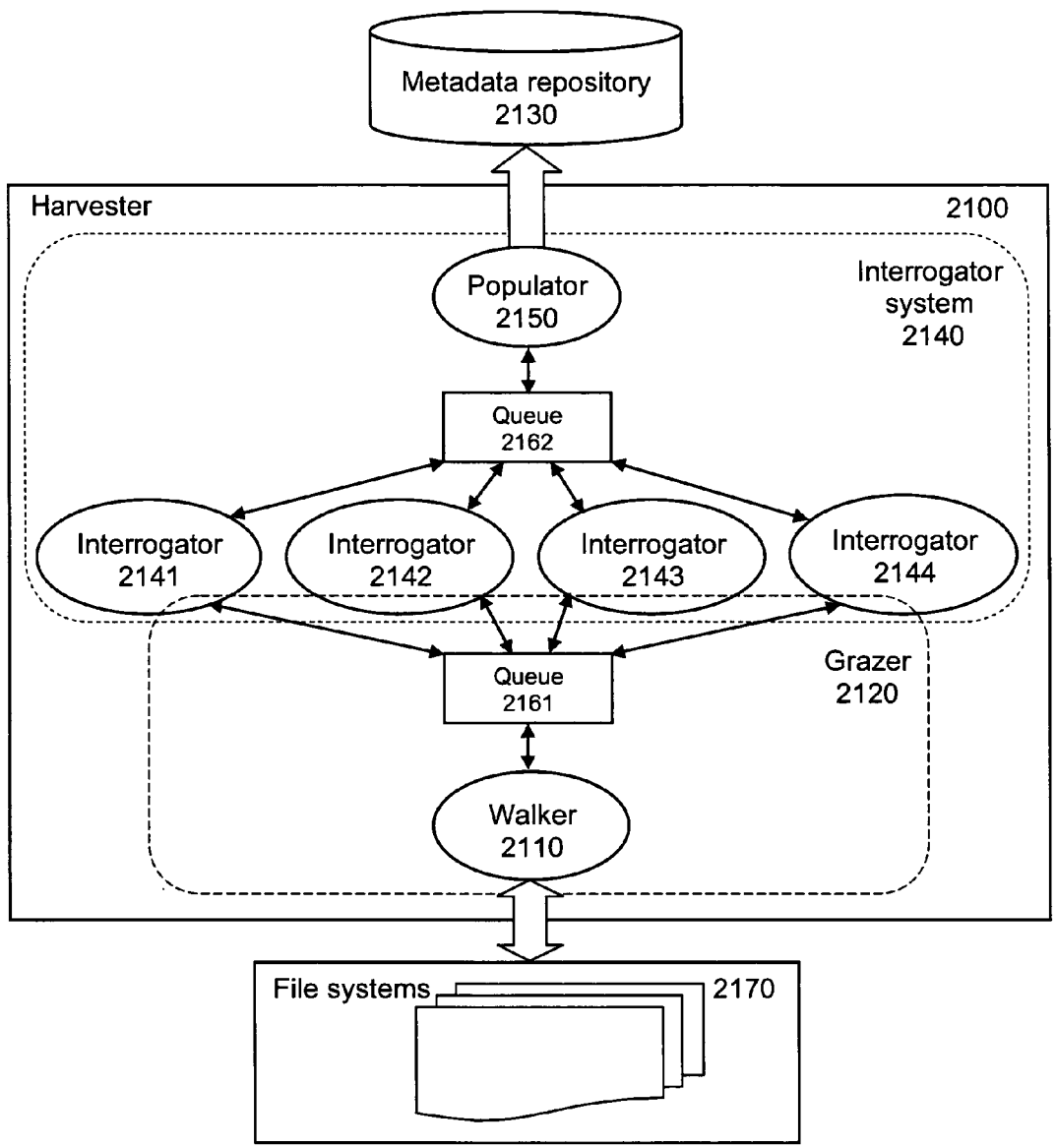

In this embodiment, file system abstraction layer/protocol adaptor 1650 can be seen as an integrated component that functions similar to file system abstraction layer 80*e* and file system protocol adaptor 80*d* described above with reference to FIG. 8. File systems 1670 might be operating respectively in accordance with a variety of file system protocols, for example, common internet file system (CIFS) 1661, Network File System (NFS) 1662, NetWare Core Protocol (NCP) 1663, desktop(s) 1664, semi-structured e-mail(s) 1665, structured sources 1666, etc. Walker 1645 can be configured to perform file acquisition on these files and directories in scheduled batches, automatically upon the occurrence of a certain file system event (e.g., grouping a set of volumes, archiving a volume, etc.), or in response to a user request (e.g., "get metadata on Volume X") from metadata explorers 1611 of Web application 1610. In this embodiment, walker 1645 is configured to perform file acquisition only and interrogator 1643 is configured to handle the majority of the metadata harvesting process at the system level (e.g., system metadata extraction, security extraction, directory mapping, etc.) as well as at the content level (e.g., text conversion, duplication computation, keyword extraction, raw entity extraction, text pattern extraction, filtering/scoping, proximity analysis, user level entity assertion, etc.). In this case, interrogator 1643 may also be configured to perform object classification. The grouping of these subcomponents of harvester 1641 is not limited to what is shown in FIG. 16. As FIG. 21 illustrates, other combinations are possible. Furthermore, the functionality of harvester 1641 can be distributed, as shown in FIG. 18.

Figure 17:
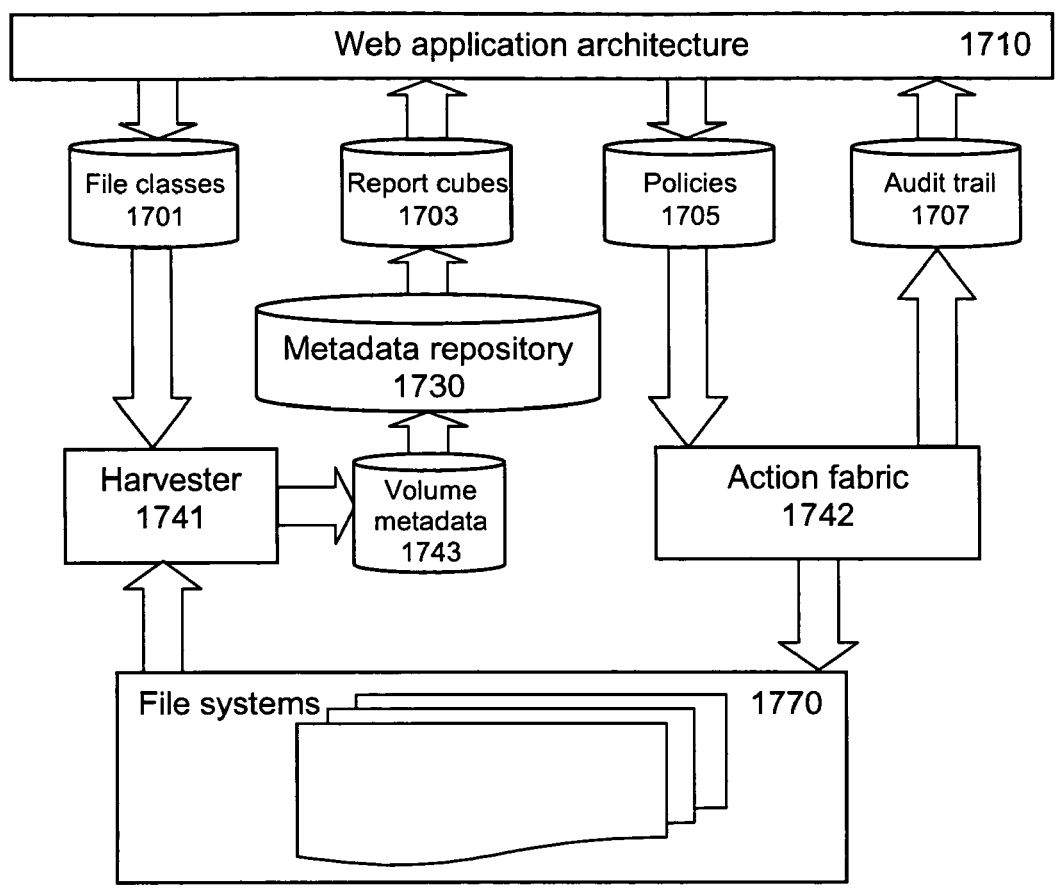

FIG. 17 is a block diagram illustrating a high level architectural view of a system platform 1700 and interactions among its various components. As exemplified in FIG. 17, through Web application architecture 1710, which is similar to Web application architecture 1610 described above with reference to FIG. 16, users with sufficient administrative privileges and/or security clearance can perform a variety of tasks and activities, for example, harvest metadata from managed objects (i.e., files and directories), take actions (e.g., move, delete, etc.) on managed objects, define/update policies and associated rules, group/manage volumes, schedule/view tasks (or "jobs"), and so on. These user tasks and activities are supported by a plurality of components including file classes 1701, report cubes 1703, policies 1705, and audit trail 1707.

In this embodiment, file classes 1701 serves as a container of file classes, each of which consists of one or more metadata. Report cubes 1703 serves as a container storing metadata that are pulled out from metadata repository 1730 as views or snapshots of certain metadata records, such as those described above with reference to FIG. 7. Policies 1705 serves as a container storing, for example, corporate policies specified by an authorized user or users via Web application architecture 1710. Audit trail component 1707 allows users to, among others, 1) audit the trail of a policy execution as applied to all managed objects of an enterprise in a comprehensive, timely manner; 2) audit the trail of a single file to investigate its history, which can be independent to any policy application/execution; and 3) audit the trail of a harvesting process to investigate, for example, how many and what metadata of how many and what files had been harvested and when.

In this example, action fabric 1742 is configured to perform a plurality of functions similar to those of action framework 1642 described above with reference to FIG. 16. That is, action fabric 1742 provides a plurality of programmable actions which can be applied to all managed objects (files and directories) of file systems 1770, which is similar to file systems 1670 described above with reference to FIG. 16, in compliance with one or more policy rules specified in policies 1705. As described above, actions can be taken in scheduled batches or triggered by events. All actions taken by action fabric 1742 are traceable by audit trail component 1707.

As shown in FIG. 17, in one embodiment, platform 1700 further includes a volume metadata 1743 which serves as a data warehouse storing classified metadata from harvester 1741 for faster, optimized access by metadata repository 1730, which is similar to metadata repository 1630 described above with reference to FIG. 16. Data warehousing can distribute control over information for decision making in an enterprise, see, for example, FIG. 19. In one embodiment, harvester 1741, which is similar to harvester 1641 described above with reference to FIG. 16, could include an object classification rules engine (not shown) that is configured to classify metadata based on file classes contained in file classes 1701.

FIG. 18 is a block diagram illustrating a federated architecture 1800, according to one embodiment of the invention. In this example, the policy management functionality provided by platform 1700 described above is divided into a federal layer 1820 and a local layer 1840, forming a distributed system that is built on top of a plurality of local systems. Federal layer 1820 may be implemented in a computer system or appliance such as director 1980 shown in FIG. 19.

In this embodiment, federal layer comprises a plurality of components including Web application architecture 1810, file classes 1801, report cubes 1803, policies 1805, and metadata repository 1830. These "federal" components are similar to Web application architecture 1710, file classes 1701, report cubes 1703, policies 1705, and metadata repository 1730 described above with reference to FIG. 17. Federal layer 1820 may be implemented in a computer system or appliance such as director 1980 shown in FIG. 19. Federal layer 1820 can be configured to support global operations such as replication and migration.

In this embodiment, local layer 1840 comprises one or more local systems, which can simultaneously function as stand-alone systems or as part of a federated file system. In FIG. 18, local layer 1840 is responsible for performing local policy management functions/operations on, for example, a first local volume and a second local volume of file systems 1870, as directed by federal layer 1820. Two local systems, referred to as volume manager 1850 and volume manager 1860, are configured to perform policy management functions and/or operations on the first local volume and the second local volume, respectively. Volume manage 1850 comprises a plurality of components such as harvester 1851, local metadata 1853, action fabric 1852, and local policies 1854. Similarly, volume manager 1860 comprises a plurality of components such as harvester 1861, local metadata 1863, action fabric 1862, and local policies 1864. These "local" components are similar to harvester 1741, volume metadata 1743, action fabric 1742, and policies 1705 described above with reference to FIG. 17. Historical data, i.e., histories of tasks and activities performed by local systems (e.g., volume manager 1850 and volume manager 1860), are retained in audit warehouse 1880 and made accessible to users via Web application architecture 1810 at federal layer 1820.

Figure 19:
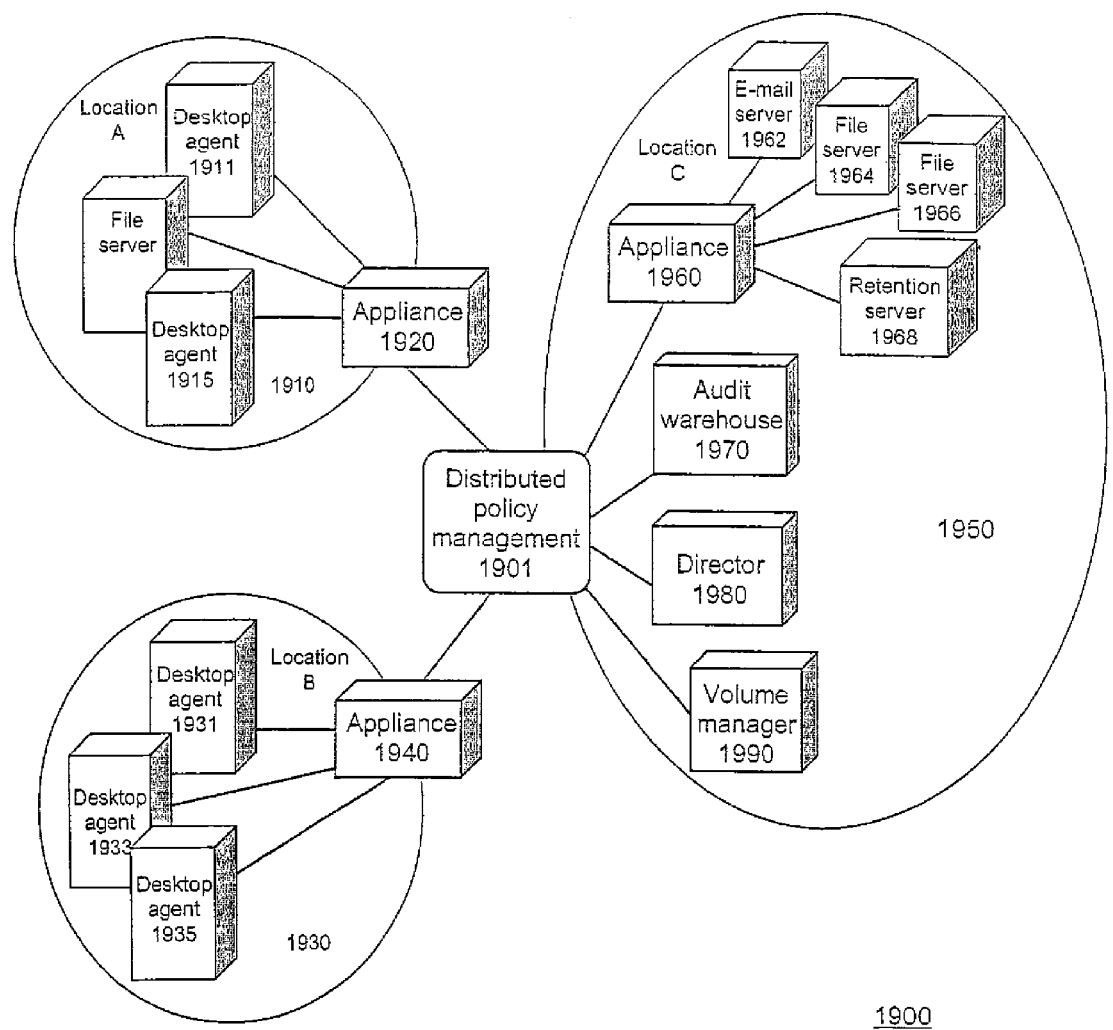

FIG. 19 schematically shows a distributed enterprise computing environment 1900 comprising a plurality of computer systems (e.g., systems 1910, 1930, 1950) residing at various locations (e.g., locations A, B, C), and an apparatus (e.g., a distributed policy management router 1901) connecting the plurality of computer systems. As an example, location C can be the main location from where the affairs of an organization are directed (e.g., corporate headquarters) and locations A and B can be field locations (e.g., satellite offices). In this example, each computer system 1910, 1930, 1950 at each location A, B, C implements a data warehouse or appliance 1920, 1940, 1960, respectively, to distribute control over information (including metadata) gathered at each location correspondingly.

In the example shown in FIG. 19, system 1950 at location C may comprise a plurality of servers such as e-mail server 1962, file servers 1964, 1966, and retention (archive) server 1968. These file servers may implement a variety of file system protocols as described above with reference to file systems 1870 of FIG. 18. Further, system 1950 at location C may implement a federated architecture in which the policy management functionality of platform 1700 described above with reference to FIG. 17 is distributed between appliance 1960, which implements a local layer such as local layer 1840, and director 1980, which implements a federal layer such as federal layer 1820, as described above with reference to FIG. 18. Similar to audit warehouse 1880 of FIG. 18, audit warehouse 1970 retains historical data pertaining to changes, policy driven events, etc. In one embodiment, some components of the policy management functionality of platform 1700 described above with reference to FIG. 17 are pushed to desktop systems (e.g., 1910, 1930) through corresponding local appliances (e.g., 1920, 1940). These distributed components, referred to as desktop agents 1911, 1915, 1931, 1933, 1935 respectively, correspondingly adapt local file system events such as keyboard interrupts in performing policy management at field locations. System 1950 can optionally include a desktop manager 1990 which functions similar to a virtual desktop agent described below with reference to FIG. 20.

Figure 20:
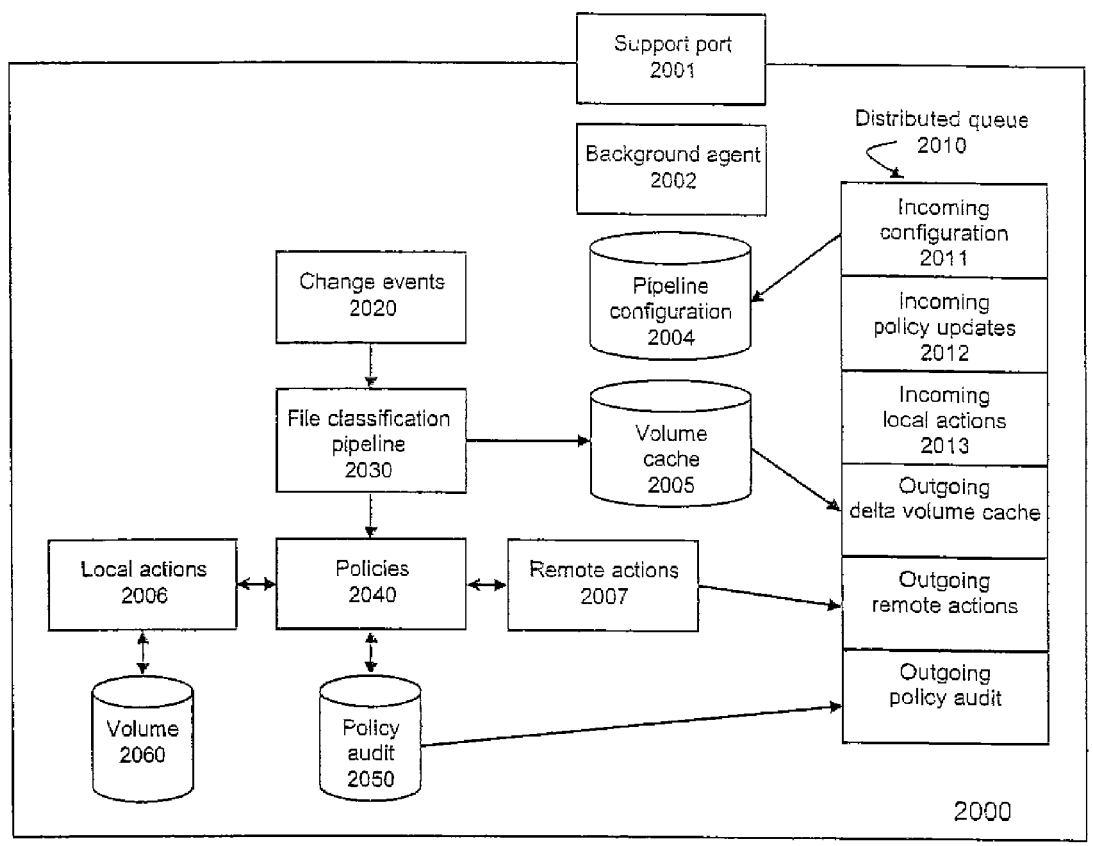

FIG. 20 is a block diagram schematically showing a virtual desktop agent 2000, according to one embodiment of the invention. In this embodiment, agent 2000 comprises a support port 2001, a background agent 2002, and a distributed queue 2010. Agent 2000 receives incoming configuration 2011 via distributed queue 2010 and stores incoming configuration parameters and/or values in pipeline configuration 2004. Incoming policy updates 2012 and incoming location actions 2013 may also be placed in distributed queue 2010, which may trigger change events 2020. As an example, agent 2000 can run change events 2020 through file classification pipeline 2030, stores new/updated file classes in volume cache 2005, and places changes (delta) to distributed queue 2010. Policies 2040 that are affected by change events 2020 through file classification pipeline 2030 may cause local actions 2006 to be taken on local volume 2060 and cause, via distributed queue 2010, remote actions 2007 to be taken on a remote volume (not shown). Historical data can be stored in policy audit 2050 and/or placed in distributed queue 2010 for later use in audit trails.

FIG. 21 depicts a harvester 2100 that can be implemented in various ways. In one embodiment, harvester 2100 comprises a walker 2110, queues 2161, 2162, a plurality of interrogators 2141, 2142, 2143, 2144, and a populator 2150, which stores harvested metadata in metadata repository 2130. Queues 2161, 2162, populator 2150, and metadata repository 2130 are similar to queues 50d, 50e, populator 50c, and metadata repository 50f respectively described above with reference to FIG. 5. Walker 2110 and file systems 2170 are similar to walker 1645 and file systems 1670 respectively described above with reference to FIG. 16. In this case, walker 2110 accesses file systems 2170 to gather raw metadata and put them in queue 2161. The plurality of interrogators 2141, 2142, 2143, 2144 then "interrogate" the raw metadata from queue 2161 independently or cooperatively.

More specifically, the plurality of interrogators 2141, 2142, 2143, 2144 can operate independently or cooperatively in performing the following functions: fetch or create a profile for each metadata record from volume ID, extract system metadata, extract security information, conduct directory (entity namespace) mapping, perform text conversion, determine and remove duplicates, extract keyword(s), extract raw (base) entities, extract text patterns, perform filtering (scoping), conduct proximity analysis and extraction, perform user level entity assertion, generate file classes, etc. Additional functions are possible. Moreover, not all functions listed herein are necessary. Some of the functions can be optional, for example, regular expression extraction, security extraction, user lookup, and hash calculation. An artisan will appreciate that it is possible to decouple and implement functionality components disclosed herein in various combinations. For example, as illustrated in FIG. 21, in one embodiment, a grazer 2120 can be configured to perform file acquisition (walker 2110) and part of basic functions of the plurality of interrogators 2141, 2142, 2143, 2144 such as system metadata extraction, security extraction, and directory mapping. In this case, queue 2161 can be an integrated component of grazer 2120. In another embodiment, an interrogator system 2140 can be configured to integrate the plurality of interrogators 2141, 2142, 2143, 2144, queue 2162, and possibly populator 2150. In any case, harvester 2100 operates to harvest a variety of metadata from file systems 2170 and stores them in metadata repository 2130 so that a plurality of programmable actions can be appropriately and efficiently applied through harvested metadata to managed objects in file systems 2170 in compliance with specified policy rules.

Figure 22:
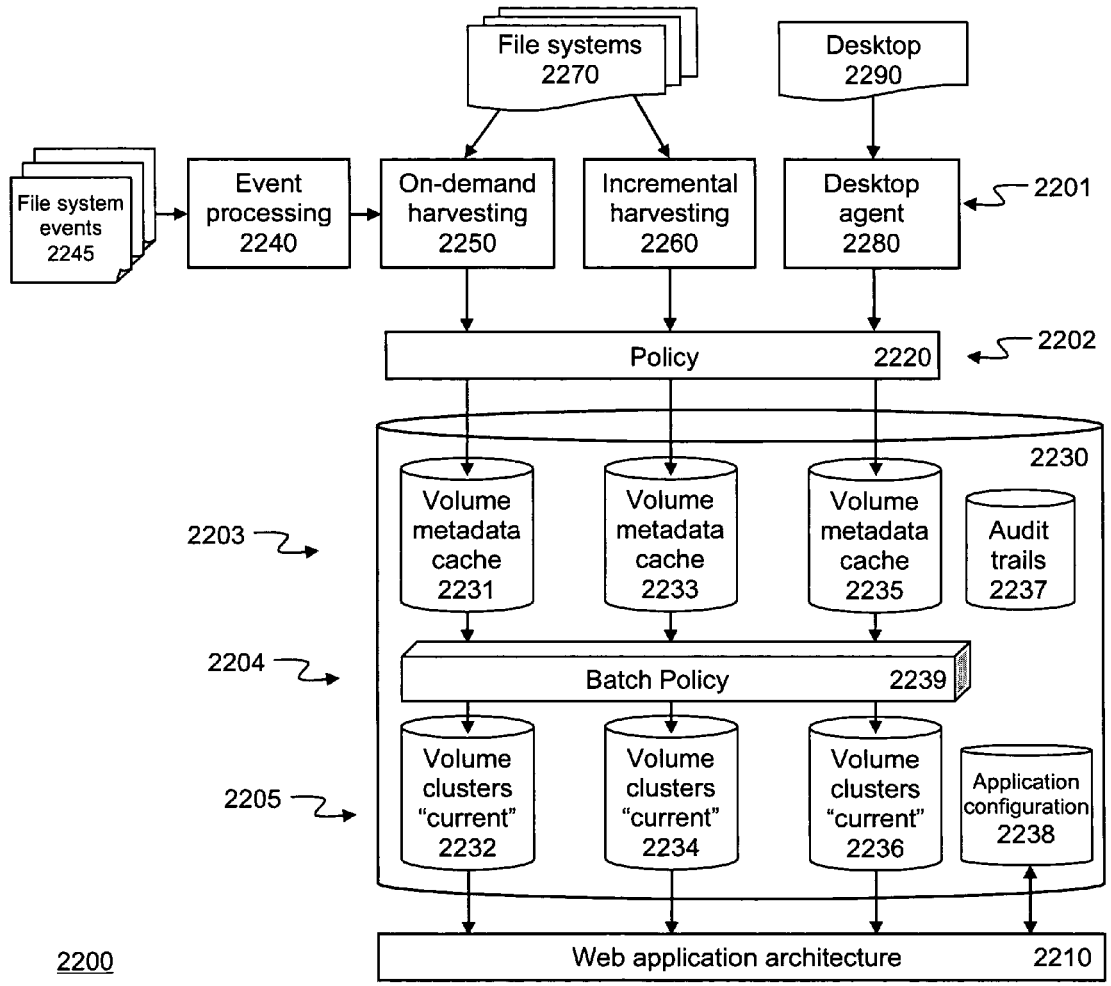

FIG. 22 illustrates the evolution of the metadata harvesting process 2200 according to one embodiment of the invention. In step 2201, metadata of a plurality of managed objects (files and directories) are gathered, collected, synthesized, or otherwise aggregated from desktop system 2290 and file systems 2270. As described above, the harvesting process can be triggered by various ways. In this example, an event processing mechanism 2240 receives and process file system events 2245 to trigger an on-demand harvesting process 2250. An incremental harvesting process 2260 handles non-event based metadata harvesting requests (or jobs) in an incremental fashion, e.g., in batches per volumes, groups, date, etc. Desktop agent 2280 adapts local events and aggregates metadata from desktop system 2290 similar to agent 2000 described above with reference to FIG. 20.

In step 2202, harvested metadata are run through a first filtering mechanism (e.g., policy 2220) in real time and placed in volume metadata caches (e.g., 2231, 2233, 2235) residing in appliance 2230. In step 2203, synthetic metadata may be synthesized from raw metadata and content-based metadata may be generated. Harvested metadata, including raw system metadata, synthetic metadata, and content-based metadata, are transformed into a common representation, as described above with reference to FIG. 5. In this case, each metadata "record" is comprised of a set of attributes associated with a file or directory that is being "harvested." "Views" or snapshots of harvested metadata can be generated as described above with reference to FIG. 7. These metadata support three application areas: 1) ad hoc queries against the metadata; 2) scheduled reporting and redaction of the metadata; and 3) the automated or semi-automated application of policies over files and directories residing in file systems 2270 and desktop system 2290. In this example, appliance 2230 further comprises audit trails 2237 for storing historical data (e.g., file history, access record, number of modifications, actions applied thereto, relevant system operations, etc.) that can be later used to audit document workflow, monitor policy execution (enforcement), generate reports, etc.

In step 2204, a batch policy process 2239 processes cached metadata (or metadata records) according to some policy rules and/or scheduling heuristic. These metadata records are processed in a batch fashion to minimize the cost of the database operation across vast metadata records. Other methodologies can also be used. In one embodiment, "fresh" or "current" metadata records and/or "views" thereof are placed in volume clusters (e.g., 2232, 2234, 2236) and made available to Web application architecture 2210 in step 2205. In this example, appliance 2230 further comprises application configuration 2238 for storing relevant application configuration parameters for Web application architecture 2210.

As described above, network file system protocols generally are not interoperable, which imposes many challenges in enforcing document workflow and retention policies in, for example, a corporate environment. Moreover, because file systems are quasi-hierarchical collections of directories and files, the notion of "triggers" and "stored procedures" are not available to file systems to ensure data correctness and integrity and to automate certain administrative and application-specific tasks. Embodiments of the invention described herein provide viable mechanisms that can address these challenges and configure a file system or systems to allow only particular content types or otherwise make decisions about what should be stored, where, and how, thereby facilitating intelligent and efficient policy management at an enterprise level, reducing business risks, ensuring regulation compliance, and promoting sensible, timely, and manageable control over vast electronic information.

Although the present invention has been described and illustrated in detail, it should be understood that the embodiments and drawings are not meant to be limiting. Various alterations and modifications are possible without departing from the spirit and scope of the invention. Accordingly, the scope of the invention should be determined by the following claims and their legal equivalents.

What is claimed is:

1. A method for enterprise policy management, comprising:
   harvesting metadata about managed objects across network file systems residing in a computing environment, wherein the network file systems operate under various file system protocols at one or more physical locations, wherein the managed objects comprise files and directories, and wherein the harvesting comprises:
      interacting with a file system abstraction layer/protocol adaptor to access the managed files and directories across the network file systems;
      collecting raw metadata of the managed files and directories;
      filtering the raw metadata in real time;
      placing the filtered raw metadata in one or more volume metadata caches;
      synthesizing synthetic metadata from the filtered raw metadata;
      generating content-based metadata, wherein generating content-based metadata for a managed file comprises processing content of the file according to a type of the file to determine one or more content-specific entities within the file;
      transforming the filtered raw metadata, the synthetic metadata, and the content-based metadata into metadata records having a common representation, wherein each of the metadata record comprises a set of attributes associated with a file or directory residing on the file systems;
      processing the metadata records; and
      placing processed metadata records in a metadata repository, each record linking a set of attributes to one of the managed objects in the network file systems;
   configuring a management device with at least one filtering mechanism, wherein the management device is coupled to the network file systems and the metadata repository;
   enabling a user to define a policy rule via a user interface to the management device, wherein the policy rule comprises a condition and a corresponding action and the condition is associated with the raw metadata, the synthetic metadata or the content-based metadata;
   selecting from the metadata repository one or more metadata records having one or more attributes that satisfy the condition defined in the policy rule; and
   applying the action defined in the policy rule to one or more of the managed objects in the network file systems that are associated with the one or more metadata records, thereby changing a state of the network file systems in accordance with the policy rule.

2. The method according to claim 1, wherein the filtering mechanism comprises a filter definition with filtering criteria specifying which of the records of the harvested metadata in the metadata repository are to be selected.

3. The method according to claim 1, wherein the action comprises deleting one or more files.

4. The method according to claim 1, wherein the action comprises moving one or more files.

5. The method according to claim 1, wherein the action comprises flagging one or more files for backup.

6. The method according to claim 1, wherein the action comprises checking one or more files into a document management system.

7. The method according to claim 1, wherein the action comprises indexing files for use in content search.

8. A computer program product comprising one or more computer readable storage media storing instructions translatable by one or more processors to perform:
   harvesting metadata about managed objects across network file systems residing in a computing environment, wherein the network file systems operate under various file system protocols at one or more physical locations and wherein the managed objects comprise files and directories, wherein the harvested metadata comprises filtered raw metadata, synthetic metadata and content-based metadata and the content-based metadata for a managed file is generated by processing content of the file according to a type of the file to determine one or more content-specific entities within the file;
   storing records of harvested metadata in a metadata repository, each record linking a set of attributes to one of the managed objects in the network file systems;
   configuring a management device with at least one filtering mechanism, wherein the management device is coupled to the network file systems and the metadata repository;
   enabling a user to define a policy rule via a user interface to the management device, wherein the policy rule comprises a condition and a corresponding action and the condition is associated with the raw metadata, the synthetic metadata or the content-based metadata;
   selecting from the metadata repository one or more metadata records having one or more attributes that satisfy the condition defined in the policy rule; and
   applying the action defined in the policy rule to one or more of the managed objects in the network file systems that are associated with the one or more metadata records, thereby changing a state of the network file systems in accordance with the policy rule.

9. The computer program product of claim 8, wherein the filtering mechanism comprises a filter definition with filtering criteria specifying which of the records of the harvested metadata in the metadata repository are to be selected.

10. The computer program product of claim 8, wherein the action comprises deleting one or more files.

11. The computer program product of claim 8, wherein the action comprises moving one or more files.

12. The computer program product of claim 8, wherein the action comprises flagging one or more files for backup.

13. The computer program product of claim 8, wherein the action comprises checking one or more files into a document management system.

14. The computer program product of claim 8, wherein the action comprises indexing files for use in content search.

15. A system for enterprise policy management, comprising:
- a management device coupled to network file systems over a network, wherein the file systems operate under various file system protocols at one or more physical locations and wherein the management device is configured with at least one filtering mechanism and a user interface;
- one or more processors; and
- one or more computer readable storage media storing instructions translatable by the one or more processors to perform:
  - harvesting metadata about managed objects across the network file systems, wherein the managed objects comprise files and directories, wherein the harvested metadata comprises filtered raw metadata, synthetic metadata and content-based metadata and the content-based metadata for a managed file is generated by processing content of the file according to a type of the file to determine one or more content-specific entities within the file;
  - storing records of harvested metadata in a metadata repository, each record linking a set of attributes to one of the managed objects in the network file systems;
  - enabling a user to define a policy rule via the user interface to the management device, wherein the policy rule comprises a condition and a corresponding action and the condition is associated with the raw metadata, the synthetic metadata or the content-based metadata;
  - selecting from the metadata repository one or more metadata records having one or more attributes that satisfy the condition defined in the policy rule; and
  - applying the action defined in the policy rule to one or more of the managed objects in the network file systems that are associated with the one or more metadata records, thereby changing a state of the network file systems in accordance with the policy rule.

16. The system of claim 15, wherein the filtering mechanism comprises a filter definition with filtering criteria specifying which of the records of the harvested metadata in the metadata repository are to be selected.

17. The system of claim 15, wherein the action comprises deleting one or more files.

18. The system of claim 15, wherein the action comprises moving one or more files.

19. The system of claim 15, wherein the action comprises flagging one or more files for backup.

20. The system of claim 15, wherein the action comprises checking one or more files into a document management system.

* * * * *

UNITED STATES PATENT AND TRADEMARK OFFICE
CERTIFICATE OF CORRECTION

| | |
|---|---|
| PATENT NO. | : 7,805,449 B1 |
| APPLICATION NO. | : 11/262282 |
| DATED | : September 28, 2010 |
| INVENTOR(S) | : Jeff G. Bone et al. |

It is certified that error appears in the above-identified patent and that said Letters Patent is hereby corrected as shown below:

Title page, item [75] inventor, Bradley Might should be CA, instead of US.

Signed and Sealed this
Twenty-seventh Day of November, 2012

David J. Kappos
*Director of the United States Patent and Trademark Office*